US011803670B2

(12) United States Patent
Haeni et al.

(10) Patent No.: US 11,803,670 B2
(45) Date of Patent: Oct. 31, 2023

(54) METHOD AND APPARATUS FOR CREATING ORGANIC COMPOSITIONS

(71) Applicant: GIVAUDAN SA, Vernier (CH)

(72) Inventors: Jerome Haeni, Carouge (CH); Jerome Perakis, Chexbres (CH); Calice Becker, Paris (FR)

(73) Assignee: GIVAUDAN SA, Vernier (CH)

( * ) Notice: Subject to any disclaimer, the term of this patent is extended or adjusted under 35 U.S.C. 154(b) by 58 days.

(21) Appl. No.: 16/766,033

(22) PCT Filed: Dec. 21, 2018

(86) PCT No.: PCT/EP2018/086518
§ 371 (c)(1),
(2) Date: May 21, 2020

(87) PCT Pub. No.: WO2019/122306
PCT Pub. Date: Jun. 27, 2019

(65) Prior Publication Data
US 2021/0397758 A1 Dec. 23, 2021

(30) Foreign Application Priority Data
Dec. 21, 2017 (GB) ...................... 1721558

(51) Int. Cl.
G06F 30/12 (2020.01)
G06F 3/0482 (2013.01)
(Continued)

(52) U.S. Cl.
CPC ............ G06F 30/12 (2020.01); G06F 3/0482 (2013.01); G06F 3/04883 (2013.01); G06F 2111/16 (2020.01)

(58) Field of Classification Search
CPC ...................................................... G06F 30/12
See application file for complete search history.

(56) References Cited

U.S. PATENT DOCUMENTS

| 5,724,256 A | 3/1998 | Lee et al. |
| 6,067,842 A | 5/2000 | Gygax et al. |
| (Continued) | | |

FOREIGN PATENT DOCUMENTS

| JP | 2005089505 A | 4/2005 |
| WO | 2005078433 A1 | 8/2005 |
| WO | 2009098693 A2 | 8/2009 |

OTHER PUBLICATIONS

International Search Report and Written Opinion of the International Searching Authority for corresponding application PCT/EP2018/086518 dated Mar. 28, 2019.
(Continued)

Primary Examiner — Roland J Casillas
(74) Attorney, Agent, or Firm — Norris McLaughlin, PA

(57) ABSTRACT

A computer terminal arranged to allow a user to produce a fragrance or flavour composition, the terminal comprising a processor, a database connection to a database storing ingredients, an output connection to an output device configured to produce a sample of the composition, a display and a user input means; wherein the processor is configured to: accept selection via the user input means of ingredients from the database; add pictograms representing the selected ingredients to an olfactive design space on the display, wherein the size of the pictogram for each selected ingredient represents that selected ingredient's olfactive contribution to the composition; convert for each selected ingredient, its olfactive contribution to a corresponding quantity of the ingredient; and, when the user requests a sample of the composition via the input means, to instruct the output device to dispense the corresponding quantity of the selected ingredients.

20 Claims, 14 Drawing Sheets

(51) Int. Cl.
    *G06F 3/04883*    (2022.01)
    *G06F 111/16*     (2020.01)

(56) References Cited

U.S. PATENT DOCUMENTS

| 2011/0123688 A1* | 5/2011 | Deo ..................... B67D 1/0027 |
| | | 426/231 |
| 2012/0018528 A1* | 1/2012 | Samain ................... H04L 67/12 |
| | | 709/219 |
| 2015/0046877 A1 | 2/2015 | Cuppari et al. |
| 2019/0172297 A1* | 6/2019 | Schwarber ............ G07F 9/0235 |

OTHER PUBLICATIONS

GB Search Report for corresponding application GB 1721558.3 dated Jun. 21, 2018.

* cited by examiner

METHOD AND APPARATUS FOR CREATING ORGANIC COMPOSITIONS

This is an application filed under 35 USC 371 based on PCT/EP2018/086518 filed 21 Dec. 2018, which in turn is based on EP 1721558.3 filed 21 Dec. 2017. The present application claims the full priority benefit of these prior applications and herein incorporates by reference the full disclosures of these prior applications.

The present invention relates to a method of creating a fragrance or flavor composition, and to an apparatus for carrying out said method.

State of the art fragrance and flavor compositions are prepared using a palette of fragrance and flavor ingredients, respectively. At the heart of the fragrance or flavor creation process lies the skill the perfumer or flavorist exercises in making inspired combinations from the ingredients palette. However, modern technologies are typically used to aid in the creative process. For example, the ingredients' palette is typically stored on a computer database, which allows recipes to be created and displayed on a computer user interface. The computer, in turn, may be in communication with a mixing robot.

A recipe will typically be displayed on a computer interface in the form of a list (in spreadsheet form) of the names and quantities of the selected ingredients. Based on the olfactive character of each of the selected ingredients, as well as the relative proportions in which they are employed, an experienced perfumer or flavorist may be able to form a reasonable mental impression of the odor or flavor of the composition, which will be of some assistance in guiding him or her through the creation process. Once the recipe is finalized, a digital signal expressing the recipe can be sent to an output device, which is adapted to mix and dispense a fragrance or flavor composition for olfactive assessment.

However, even for very experienced perfumers or flavorists, the creative process can entail multiple iterations of recipe adjustment in which complex creations require multiple design, dispensing and olfactive assessment steps, all of which is time consuming, exhausting on the nose and/or the palate of the perfumer or flavorist, and is wasteful of valuable perfume and flavor ingredients.

However, in addition to these issues that are essentially associated with process efficiency, the creation process is also an important moment in the development of the relationship between the perfumer or flavorist, and the customer. Flavor and fragrance creations are critically important components of the identity of branded products, and it is important that they are favorably received by the customer. To this end, it is not uncommon for customers to be closely involved in the creation process, in the expectation of creating trust and understanding, which in turn can positively influence customer preference and acceptance. However, despite the attendant advantages of this co-creation approach, the nomenclature of classical odor description used by perfumers and flavorists to communicate with clients is somewhat subjective and can in some cases create barriers to understanding and ultimately preference and acceptance. Moreover, the spreadsheet list of ingredients that the perfumers and flavorists work with is impenetrable to a non-expert.

There remains a need for a creation tool that enables perfumers, flavorists, evaluators and any other actors involved in the creation process to better understand and communicate the sensory and functional attributes of a perfume or a flavor composition, rendering the iterative design process simpler, cheaper, and more sustainable, as well as more intuitive to customers, thereby promoting customer acceptance and preference for fragrance and flavor creations.

These needs are addressed by the present invention, which provides in a first aspect a computer terminal arranged to allow a user to produce a fragrance or flavor composition, the terminal comprising a processor, a database connection to a database storing ingredients, an output connection to an output device configured to produce a sample of the composition, a display and a user input means; wherein the processor is configured to: accept selection via the user input means of ingredients from the database; add pictograms representing the selected ingredients to an olfactive design space on the display, wherein the size of the pictogram for each selected ingredient represents (or corresponds to or is proportional to) that selected ingredient's olfactive contribution to the composition; convert for each selected ingredient, its olfactive contribution to a corresponding quantity of the ingredient; and, when the user requests a sample of the composition via the input means, to instruct the output device to dispense the corresponding quantity of the selected ingredients.

In accordance with the present invention, a designer is able to interact with a user input means that is configured and operable to allow the designer to select ingredients from a menu and place them onto an olfactive design space, thereby creating a virtual fragrance or flavor composition in a visibly impactful form. The method of the present invention allows for a simple, fast and intuitive creation of a fragrance or flavor composition, resulting in an instruction to output a sample of any volume.

The olfactive contribution of a fragrance ingredient describes the ingredient's influence on the overall impression of the fragrance composition. The larger the contribution, the more prominent will the olfactive contribution of the fragrance ingredient be in the fragrance composition. Hence, the larger the pictogram, the greater the influence of the ingredient in the composition. Conversely, the smaller the pictogram, the smaller the influence of the ingredient in the composition.

The olfactive design space is an area of the display/screen used (primarily) for olfactive representation. The selection and quantification of an ingredient is greatly simplified by the user input of pictograms in this olfactive design space, the size (area, length/width/diameter/radius/periphery or other measure of size) of which represents an ingredient's olfactive contribution to the overall impression of the fragrance or flavor composition. Furthermore, the manipulation of the ingredient selection and olfactive contribution is very intuitive. Also, the use of the pictograms allows at all stages throughout the design process for a visualization of the fragrance or flavor composition being created, therefore providing important cues to the designer and reducing the number of iterations required to achieve a desired result.

A fragrance composition is a composition comprising one or more fragrance ingredients, which is able to provide a fragrance, odor or smell. The terms fragrance, odor and smell are used interchangeably throughout this description.

A flavor composition is a composition comprising one or more flavor ingredients, which is able to provide a flavor or aroma. The terms flavor and aroma are used interchangeably throughout this description.

The overall impression of a flavor or fragrance composition is typically dominated by its odor or aroma, be it by direct smelling of a headspace or—in the case of a flavor composition—also retro-nasally upon consumption. However, for a flavor composition, some or all of the five common tastes (sweet, sour, bitter, salty and umami) may also contribute to the overall impression, of course, and may even be dominant if certain ingredients are present in excessive amounts. The first impression of a fragrance or flavor composition is typically dominated by its headspace, i.e. the volatile components emanating from the composition.

A fragrance or flavor ingredient may be a single chemical substance or a combination of chemical substances. Furthermore, the ingredients may have natural, semi-synthetic or synthetic origin. It is also possible to use a sub-formula, i.e. a combination of fragrance or flavor ingredients that are used in a fixed ratio, and to add such a sub-formula as one ingredient. Sub-formulae may already be defined in the database, or may be added to the database by the designer.

The method of the present invention is advantageously carried out using a computing system and a local or remote connection to a database. Hence the database may be stored locally or remotely, internally or externally.

The processor may be configured to accept adjustment of a pictogram size by the user input means to change the olfactive contribution of a selected ingredient in the olfactive design space. This change may lead to re-conversion of the olfactive contribution to the corresponding quantity of the selected ingredient, either immediately, or only when the output device is instructed. The quantity of the ingredients may be displayed, for example as an absolute, or as a relative, for instance volume or weight/mass or molar percentage contribution to the fragrance. Such display may be anywhere on the screen, perhaps labelling the pictogram (preferably within the pictogram). The name of the ingredient may also label the pictogram.

The fragrance or flavor ingredients are selected from a database of ingredients and the display may include a selection menu displaying ingredients available for selection in the database. In one embodiment, the selection menu is provided in a different display location from the olfactive design space. The processor may be configured to show the selection menu and the olfactive design space simultaneously, for ease of input. For example, there may be a selection palette/menu of ingredients, for instance in a scrollable form, at the edge of the display, such as at the bottom, and the olfactive display space may occupy a central position in the display.

A comprehensive list of suitable ingredients may be found in the perfumery literature, for example "Perfume & Flavor Chemicals", S. Arctander (Allured Publishing, 1994), as well as later editions of this work, which are herein incorporated by reference.

For each ingredient, at least one defining character, property, or function of that ingredient may be stored in the database, preferably in digital form.

The defining character, property or function of an ingredient may be a physical, chemical or sensory attribute that may have a bearing on the olfactive character and/or the olfactive olfactory contribution to the overall impression a fragrance or flavor composition, but may also be general information on the ingredient, such as commercial or regulatory information affecting how and in what quantities it should be used in application.

Such physical or chemical attributes might include properties such as vapor pressure, odor detection threshold, polarity, c log P, solubility, and the like.

Sensory attributes might include the qualitative odor description of an ingredient.

Functional attributes might include the efficacy of an ingredient to alter a mood or behavioral response in a subject after smelling or tasting it; or the ability or efficacy of an ingredient to counteract or mask the effects of a source of malodour.

Spatio-temporal performance criteria, such as tenacity, substantivity, bloom, radiance, volume, and trail, may also be incorporated as useful attributes. Optionally, these attributes may be calculated by using suitable algorithms implemented in the creation tool. Examples of suitable algorithms include Vapor Liquid Equilibrium (VLE) calculation and the calculation of the hydrodynamic transport equations for both diffusion and convection regimes.

Tenacity is the property of an ingredient to remain for a certain time on a substrate. The higher the tenacity, the longer the remanence of the ingredient on that substrate. The tenacity not only depends on the vapor pressure, but also on the existence of specific interactions between the ingredient and the substrate.

Substantivity is governed by tenacity and perception. Tenacious ingredients having low olfactive thresholds are substantive. The substantivity is a key performance indicator for both consumer product and fine fragrance ingredients, as well as for ingredients used in some flavored products, such as chewing gums.

Bloom is the property of an ingredient to generate a strong sensory impact around a perfumed source for a short period of time. Bloom is a key performance indicator for rinse-off products, such as shampoo and shower gel ingredients.

Volume or radiance is the property of an ingredient to be perceived in the air around a perfumed source for a prolonged time. Volume is often referred to as "room filling" and is a key performance indicator for air freshener, fine fragrance ingredients and some flavored products, especially coffee and fresh bread.

Trail (or sillage) is the property of an ingredient to be perceived following a moving source perfumed with this ingredient. Trail is influenced by volume and air convection flows.

The ingredients database may further contain general information, such as the chemical composition (i.e. single chemical substance or combination of chemical substances); the chemical formula and structural formula of each chemical substance contained; the origin (natural, semi-synthetic or synthetic); for naturals: the source; the density; the melting point; the boiling point; the partition coefficients, such as air/water partition coefficient, water/oil or water/fat partition coefficients and air/oil or air/fat partition coefficients, and the like; a list of authorized countries; a concentration limit defining a maximum concentration, where applicable for certain countries; the price; the stability; a list of ingredients which are often used in combination with said ingredient; a list of ingredients which are often used as a replacement for said ingredient; typical applications (e.g. personal care fragrance or dairy food); restrictions with regard to formulation (e.g. concerning encapsulation); etc.

The skilled person will appreciate that a database could be populated with all manner of attributes of ingredients that can be measured by analytical or sensory-evaluation techniques generally known in the art. Some or all of the ingredient information may be viewed by the user by selecting an ingredient (from the selection menu or olfactive design space), and indicating a detailed information request, such as by double clicking a name or icon.

The database enables the designer to examine the entire palette of fragrance or flavor ingredients and compare and contrast their physical, chemical, sensory and functional attributes, such as odor direction, odor family, commercial success, cost attributes, the property of exerting a particularly desirable technical effect, such as malodour-control, or mood- or behavior-modifying effects. In this way, using known clustering programs, an application (for example running on the processor or feeding results to the processor) can use the database to make attribute-based recommendations to a user for the purpose of fragrance or flavor formulation design. For example, such an application can recommend ingredients or a range of ingredients that share one or more attributes or characteristics; or it can recommend ingredients that are responsible for a certain characteristic in a mixture of ingredients; or it can prescribe limits on the amount of an ingredient relevant for a desired characteristic. Furthermore, using pattern recognition software, it can compare the palette of ingredients with commercially successful formulae or formulae having other desirable attributes, in order to discover ingredients or clusters of ingredients that are correlated to win-rates. Still further, the attributes for individual ingredients could be normalized against commercial reference ingredients that are interesting for their character, cost or performance, or which are particularly valued by a certain customer.

The database can contain data from a variety of inputs. Its content may also be edited by a user via the user input means, e.g. by adding additional information. Also, the ingredient record may be automatically complemented by the computing system, based on the compositions created and/or stored. This may involve a statistical analysis of the compositions.

During the creation process, the designer can select ingredients from the database and add them to the olfactive design space on the display (usually a screen but potentially a projected display or other display) of a computer provided therefor (the terminal). The selection may be carried out using any of the known input means, such as selection using a touchscreen, scrolling and selecting via a keyboard, mouse, joystick or other such physical input device, or by voice activation means. Input may also be made remotely via an intranet or internet connection, e.g. from a remote computer or smart phone. Thus the user input means may include a touch-sensitive mechanism of the display (a touchscreen) and/or a mouse or tracker ball or joystick and/or a voice input means and/or a keyboard and/or a remote input connection (for any of the above direct input mechanisms) over a network. It is also possible to combine several of these input methods, thereby allowing a single user to use different input methods for improved operability and/or several users to access the system simultaneously and/or consecutively. This facilitates the collaborative creation of a fragrance or flavor composition.

As mentioned above, an ingredient selection menu on the display may present ingredient information stored in the database and the olfactive design space may be provided on the display using any of the graphical user interface elements known in the art.

Preferably, the ingredient selection menu, as well as the olfactive design space, are displayed on a touchscreen. The ingredient selection menu may display the ingredients in the form of a simple list of names or as pictograms, or both. They may be ordered or grouped in accordance with any shared characteristic, e.g. according to their odor family.

Preferably, ingredients in the menu are arranged and displayed on the display such that those sharing similar characteristics are grouped closer together and those with divergent characteristics are relatively spaced apart, thereby facilitating ingredient selection.

If, owing to the number of ingredients that need to be displayed on the user interface, it is not possible to display them all together on a single graphical user interface, they may be accessed by user-controlled scrolling, or they may be accessed by drop-down menus, wherein the drop-down menus contain groupings or sub-groupings of ingredients arranged according to shared characteristics. For example, fragrance ingredients may be grouped and sub-grouped according to odor family characteristics, such as fruity, green, marine, floral, oriental, woody, mossy, musk, aromatic and citrus ingredients Other visually impactful means may be employed on the ingredient selection menu to recommend or dissuade usage of a particular ingredient based, for example, on prior ingredient selection inputs in order to create particularly desirable or useful ingredient combinations. Thus, it is also possible to highlight certain ingredients by color change or color intensity change, use of bold or italic script, increasing or decreasing the size of a pictogram, use of pulsing or flashing script or pictograms, or using other markings, such as the use of emojis to indicate satisfaction or dissatisfaction.

A selected ingredient may be highlighted on the ingredient selection menu, e.g. by increasing its size or the color intensity or by flashing. The selection may also prompt the display of information on the selected ingredient as mentioned above, such as its chemical composition, odor or aroma attributes, and the like, in order to help the user to review and confirm the choice.

The selected ingredient is added to the fragrance or flavor composition currently being created by moving it to the olfactive design space on the user interface. This can be achieved by the input means referred to hereinabove, as a direct result of selection or may be a separate input.

As a main usage mode, the user may select and move the ingredient from the menu to the design space at the same time via the touchscreen. For example, the user may simply swipe (drag and drop) the ingredient into the olfactive display space, or double click to select the ingredient and add it to the olfactive design space. Another user-friendly way of adding an ingredient is to type it in using an on-screen or separate keyboard.

Within the olfactive design space, the pictograms of the selected ingredient may be more or less arranged arbitrarily, for instance according to the designer's discretion (potentially with an automatic positioning only on initial selection). In this type of representation, the user may move the pictograms around freely in the olfactive design space, may arrange certain ingredients closer together or group them, for example to indicate a similar ingredient character, or preferred grouping. Such movement aids the designer's intuitive design of the fragrance or flavor, and he or she can simply use drag-and-drop functionality on a touchscreen or double-click, drag-and-drop functionality on a keyboard and/or mouse, for example, to effect the movement.

The pictograms themselves may be assigned a color, for example indicating a particular odor or aroma family, which may be the same for the ingredient in the selection menu and the corresponding pictogram in the design space. Pictograms of ingredients having a similar odor or aroma character may be assigned similar colors to visualize the similarity.

As a display alternative to the user-led positioning mentioned above, it is also possible that the olfactive design space is in the form of a coordinate grid, and ingredients drawn into the olfactive design space organize themselves as an array of coordinates in accordance with certain characters, properties, or functions that are stored in the underlying ingredients database. For instance, the olfactive design space may be an x-y coordinate grid plotting the odor detection threshold of an ingredient on one axis, and its vapor pressure on the other. It is also possible to include a third (z) axis that represents another characteristic parameter, such as an ingredients c log P. The coordinate axes may be linear, logarithmic or whatever else is typically used in the art for a given property or parameter.

Thus, in one embodiment, the olfactive design space is defined by an array of coordinates, each coordinate indicating a specific property of the selected ingredients.

More particularly, a first coordinate may indicate the odor detection threshold of each ingredient and a second coordinate its vapor pressure.

In yet another dimension, ingredient pictograms may be mapped as a function of time, whereupon individual pictograms will be seen to reduce or decrease in size in proportion to the relative olfactive contribution of ingredients to the overall impression of the composition over time.

In a particular embodiment, the processor may accept user input to switch and/or chose between several different types of representation of the olfactive design space, e.g. by choosing different parameters to plot on the various axes of the coordinate grid and/or by choosing a user-led positioning.

The visually impactful manner in which the ingredients are depicted on the user interface is an important aspect of the present invention as it allows the designer to finesse the design of a fragrance or flavor composition, before committing to actually producing a chemical mixture for assessment. It is also an efficient, but fun and engaging way to interact with co-creators or customers during the design process and allow multiple users to co-create a composition with immediate visualization of additions/changes to the composition during design. In one embodiment, the user input means (which may encompass a plurality of different physical components) accepts remote and local user input. For instance, one user can add a new ingredient for example by using a touchscreen in a remote location, and another user (the local user) can adjust its size at the terminal location, for example also by use of a touchscreen, or by voice or keyboard input. The skilled reader will appreciate that either of these users can carry out any of the methods elucidated herein. If there is conflicting input at exactly the same time, the processor can decide on which input to implement, for example in dependence upon pre-set priorities.

The user(s) may adjust the pictogram size(s) by any suitable method of an input means, such as by keyboard input (for example of a number representing a relative or absolute quantity or contribution of an ingredient or a "+" or "−" to step a size up or down), voice control, touchscreen input or any other suitable functionality, which may be local or entered at a remote location, in which case the input means include a connection to input the adjustment using the remote functionality. As a main usage mode, adjustment of a pictogram size responds to a spreading or pinching (contracting) movement of user digits on the touchscreen.

Some functionality may be automatic to allow simplicity of basic use. For example, the first pictogram for the first selected ingredient may be added at a default size (and/or position if the positioning is user-led). Further pictograms for further ingredients may also be added at the default size (and/or a second default position) so that they have the same olfactory contribution as the original contribution of the first selected ingredient (before any user adjustment).

An ingredient may be depicted on the olfactive design space as a pictogram having any suitable shape, such as a regular geometric shape, e.g. a circle, ellipse, square, triangle or polygon, and more particularly a circle. In case the olfactive design space is 3-dimensional (such as a hologram), the pictograms will typically also be 3-dimensional, e.g. depicted as spherical, ellipsoidal or polyhedral, preferably spherical. The pictograms may all be of the same shape or have different shapes, for instance depending on their odor/aroma or type of application. The pictograms may also have a shape indicating the odor or aroma of the respective ingredient, e.g. lemon-shaped for citrus or flower-shaped for floral.

As set out above, the ingredient pictograms may also have the same or different colors. If they have different colors, then the color preferably indicates, or is suggestive of, the odor of the respective ingredient, e.g. yellow for citrus or blue for marine.

It is also possible to use pictograms having both different shapes and different colors as an indication of the ingredient's odor or aroma.

The size of the pictogram corresponds to the olfactive contribution of the respective ingredient in the fragrance or flavor composition. Thus, the size or surface area of an ingredient pictogram is correlated with the ingredient's influence on the overall impression of the composition. The larger its pictogram in the olfactive design space, the more prominent will the olfactive contribution of the ingredient be in the fragrance or flavor composition.

Naturally, when only a single ingredient is displayed on the olfactive design space, the size of the pictogram is a visual representation of 100% of the olfactive contribution. However, as second and subsequent ingredients are added to the olfactive design space, each of the selected ingredients will contribute a fraction of the overall olfactive contribution of the fragrance or flavor composition, depending on the size assigned to the respective pictogram.

As mentioned above, the olfactive contribution may be displayed in absolute or relative values. In the case of absolute olfactive contributions, the sum of the olfactive contributions of all selected ingredients is not limited, but may increase or decrease upon the addition of a further selected ingredient depending on the olfactive contribution chosen for said ingredient. Consequently, the dimensions of pictograms already present on the olfactive design space will usually remain unchanged.

In the case of relative olfactive contribution, the sum of the olfactive contributions of all selected ingredients will always add up to 100%. Consequently, in this particular embodiment, the individual pictograms decrease) in size upon the addition of a further selected ingredient, in response to the relative olfactive contribution that each ingredient makes to the flavor or fragrance composition.

In any case, the pictograms displayed on the olfactive design space will provide a visual impression of the fragrance or flavor composition, as the sizes of the pictograms in a standard view (olfactive contribution representation) will indicate the olfactive contribution of each of the selected ingredients in relation to all the others.

In some embodiments, an alternative representation (view) is available, in which the olfactive design space can be configured such that the sizes of the ingredient pictograms are proportional to the quantities or concentrations of the respective ingredients (quantity mode).

In another alternative representation, which may be available, the sizes of the ingredient pictograms are proportional to the cost contribution of the respective ingredient. This representation takes into account the relative cost of a selected ingredient compared to the total cost of the composition. Alternatively, the cost contribution of an ingredient may also be indicated by the color of the respective pictogram. For example, the most expensive ingredient may be shown in red and the least expensive ingredient in green, while the colors of the other ingredients' pictograms are selected between these two colors.

Still further, if the ingredients database contains data on the kinetics of evaporation of individual ingredients, the processor can instruct the display to provide an alternative time-dependent representation with a dynamic olfactive finger print showing how a perfume or flavor impression develops over time, and providing the designer with insights into how the fragrance or flavor will behave in application.

In a particular embodiment, the user may switch and/or chose between the olfactory contribution representation and any alternative representations.

Furthermore, it is possible to split up the fragrance or flavor composition into several parts, e.g. a fruity, a woody and a green accord or a citrus aroma and a sweetener, and to work separately on each part. Again, each part can be addressed by one and the same user or by several users or groups of users, some of which may optionally be remote. Advantageously, the ingredients used for one of these parts are grouped or linked on the olfactive design space.

The virtual fragrance or flavor composition designed using the terminal of the present invention can be recorded digitally, and/or the data representing the odor (in terms of the quantities/proportions of the ingredients selected) can be used to instruct an odor output device in order to generate the composition.

For this purpose, the olfactive contribution of each ingredient is converted to a corresponding quantity or proportion. This conversion can be executed by the same device as used for selecting the ingredients, by the output device, or by one or more separate devices.

The olfactive contribution of an ingredient to the overall impression of the fragrance or flavor composition depends on its quantity or concentration in the composition and on its general impact strength. In particular, for fragrance ingredients, the impact strength may be related to the vapor pressure and the odor detection threshold. These parameters are well-known to the person skilled in the art and are preferably stored in the ingredient database. For example, the olfactive contribution may be defined as the equilibrium headspace divided by the odor detection threshold multiplied by a quantity parameter (e.g., the quantity of the ingredient or by the ratio of the ingredient quantity to the composition quantity).

Additionally, dose-response curves may be stored (locally or remotely) and visualized, providing additional impact score. Dose-response curves express the evolution of the impact of an ingredient as a function of the concentration of this ingredient in the headspace.

For one ingredient, a very low quantity/concentration may be enough for the ingredient to be noticeable, whereas another ingredient may require a much higher quantity/concentration. Consequently, the correlation between the olfactive contribution of an ingredient and the quantity to be used in the composition may vary greatly from one ingredient to another, and is not necessarily linear.

The output device is then instructed to dispense and mix the selected flavor or fragrance ingredients in the respective quantities, thereby generating the fragrance or flavor composition.

To this end, any suitable output device known in the art may be used, for instance a sampling automat such as those typically used in the pharmaceutical industry or a Virtual Aroma Synthesizer (VAS™). U.S. Pat. No. 6,067,842 and US 2005/0244307 describe such Virtual Aroma Synthesizers. Depending on the output device and the fragrance or flavor composition, the selected ingredients may be filled into a receptacle, or vaporized, or ablated from an ingredient reservoir using a stream of air, or sprayed from a pump, or atomized.

The fragrance or flavor composition advantageously is created using an output device proximate to the user interface (a main display and a main user input means if there is more than one location involved in the design process), thereby providing immediate feedback to the user. This allows the user to explore a vast array of ideas instantaneously. Furthermore, it improves the interaction of the user with a customer, as it enables the user to adjust the selected ingredients and/or their olfactive contributions according to the customer's desires and to almost instantaneously create modification to a fragrance or flavor composition.

Alternatively or in addition, the calculated quantities of the selected ingredients may be sent via electronic means to another location, where the fragrance or flavor composition is created. This allows for an easy sharing of the composition with co-workers, evaluators, and/or customers.

By means of the method and apparatus of the present invention, the designer has the freedom to create a highly visually impactful digital display of a fragrance or flavor composition. The designer may compare its virtual odor with flavor or fragrance formulae stored on the database having particular attributes, such as odor character, commercial success, cost advantages and the like, which the designer may adopt, reject, modify or fine-tune on screen at it discretion. This considerably simplifies the design process, reducing iterative aspects of the design process, reducing time, cost and material waste. Furthermore, the data-processing component of the apparatus is able to continuously train itself with regard to predicting fragrance and flavor composition performance and customer preference.

Additional information on the ingredients (either on the selection menu or in the olfactive design space or both) can be of benefit to the designer. Hence the processor may be configured to retrieve from the database and display to the user additional ingredient information including one or more of: information relating to a maximum amount or concentration of an ingredient allowable, preferably in dependence upon a target geographical use; information relating to ingredients conforming to a target application for the composition; an alternate ingredient recommended to be used in place of an ingredient; and an associate ingredient recommended to be used in combination with an ingredient.

In one embodiment, the database comprises, for each ingredient, a concentration limit defining a maximum concentration of the respective ingredient in the fragrance or flavor composition. This maximum concentration may be due to reasons related to regulation or industry practice, for instance.

Preferably, said concentration limit is taken into account when creating the fragrance or flavor composition. This can be done by the processor, e.g.: calculating a total quantity of the fragrance or flavor composition by adding the quantities of all selected ingredients, calculating the concentration of each selected ingredient by dividing its quantity by the total quantity, and if the concentration of a selected ingredient is above the concentration limit, highlighting the respective pictogram or adjusting it to a size corresponding to a quantity of said ingredient at or below the concentration limit.

The pictogram of an ingredient exceeding the concentration limit may be highlighted (on the display) by flashing or changing color or by marking it with a suitable sign, for instance. In particular, the concentration limit may be displayed within said pictogram in order to indicate the maximum concentration that should be used. For example, if a circular pictogram is used, a circle such as a red dashed circle may indicate the maximum concentration.

Alternatively or in addition, it is also possible to display a warning message somewhere else on the display, informing the user of the ingredient(s) the concentration(s) of which is/are above the respective concentration limit(s). This may further include an indication of the concentration limit, optionally together with the current concentration.

It is also possible that the size of said ingredient pictogram is automatically adjusted to a size corresponding to a quantity of said ingredient at or below the concentration limit.

In either case, it is advantageous if one or more replacement ingredients are suggested, as described below. This allows for partial or full replacement of the ingredient exceeding the concentration limit.

In one embodiment, the database further comprises a list of authorized countries in which the ingredients are authorized. This can be used for verifying that the selected ingredients and thus the envisaged composition may be marketed in a certain country.

To this end, the processor may carry out the steps of accepting input of a target country for the fragrance or flavor composition, checking the list of authorized countries of each of the selected ingredients, and in the case that one ingredient is not authorized in the target country, highlighting or removing the pictogram of said ingredient.

The target country may be selected from a list or directly typed in by the user.

There may also be certain design constraints requested by a customer or other market constraints, which may be addressed in analogous fashion.

The pictogram of an unauthorized ingredient may be highlighted by flashing or changing color or by marking it with a suitable sign, for instance.

Alternatively or in addition, it is also possible to display a warning message somewhere else on the display, informing the user of the ingredient(s) which does/do not comply.

It is also possible that said ingredient pictogram is automatically removed.

In either case, it is advantageous if one or more replacement ingredients are suggested, as described below.

In one embodiment, the database further comprises at least one alternate ingredient which may be used instead of an ingredient. Typically, such an alternate ingredient will have a similar effect as the original ingredient, but differ in certain other characteristics, such as authorized countries and concentrations, toxicity, detection threshold, stability, or costs, for instance.

In particular, the processor may be configured to propose an alternate ingredient to replace at least one of the selected ingredients. This is particularly useful in case one of the selected ingredients cannot be used, e.g. because it is not authorized in the selected country, or may not be used in the selected concentration.

Furthermore, an alternate ingredient may be used for reducing the costs, improving the stability, adjusting the density, adapting a composition to a certain type of application, etc.

In one embodiment, an ingredient record further comprises at least one associate ingredient recommended to be used in combination with said ingredient. Suitable associate ingredients may be added to the ingredient record by the user or may have been defined automatically, e.g. based on a statistical analysis of earlier fragrance or flavor compositions. Thus, an associate ingredient is an ingredient typically used in combination with said ingredient, e.g. to improve the impact or the stability.

In particular, the processor may be configured to propose an associate ingredient of at least one of the selected ingredients to be added to the fragrance or flavor composition.

In one embodiment, the database further comprises information about suitable applications.

Typical applications of fragrance or flavor compositions created by the method of the present invention include, but are not limited to, personal care products, laundry care products, home care products, air care products, sweets, dairy products, savory food, hot and cold beverages, or pet food.

Depending on the intended application, the fragrance or flavor compositions may be further combined with additional ingredients, such as preservatives or diluents, and/or may be encapsulated and/or be applied to a suitable carrier. This may further limit the list of suitable ingredients as defined in the database.

In particular, the processor may be configured to carry out the steps of: accepting input of a target application for the fragrance or flavor composition, and displaying a subset of ingredients that conform with the target application for selection.

The user then has the possibility to define the application at the beginning of the creation process to obtain a subset of ingredients compatible with the selected application. Thus, the list of ingredients can be limited prior to the selection.

Alternatively or in addition, the selection of the application may also be made at a later stage when some or all ingredients have been selected. Upon selection of an application at this stage, ingredients that are not suitable for said application will be highlighted as described above. Again, it is advantageous if one or more replacement ingredients are suggested.

It can be advantageous for the user to link ingredients together, particularly if he or she considers them to together form a coherent part (chord or accord) of a fragrance or aroma. Or ingredients that have a similar effect or that complement each other may be grouped or linked. Thus, the processor may be further configured to accept linking user input linking at least two of the selected ingredients into a group. The link may be visualized on the display as lines drawn between the ingredient pictogram. In some embodiments, when the size of one of the pictograms of the linked ingredients is adjusted by the user, the processor is configured to automatically adjust the size(s) of all the other pictograms of the linked ingredients so that they remain in the same proportions. This allows for fixing the ratio between the linked ingredients, and or for adjusting the olfactive contribution (or concentration) of a group of linked ingredients at the same time. The linked ingredients may be given a name and handled as a single entity. The processor may display such a group as a single possibly different pictogram, such as a rectangular or square pictogram.

The user may wish for a simpler representation, for example to use in co-creation. For example, the processor may be configured to accept user input to switch to a graphical display mode in which a graphical representation is used for one or more of the selected ingredient, and the processor instructs display of one block of the corresponding graphical representation on the display for the one or more selected ingredients.

In this embodiment, the database may further comprise at least one graphical representation pertaining to each of the ingredients. Such a graphical representation may be, for instance, a simple color typically associated with the odor or aroma, a drawing or photograph or similar representation of a plant, vegetable, fruit, food or beverage having a similar odor or aroma, or imagery typically associated with a certain impression conveyed by the ingredient, e.g. refreshing or relaxing. The user input means may be employed to define or change such a graphical representation, for example to change the color/image or the size of the graphical representation. The graphical representation may be in a block shape, such as a rectangular block.

In particular, a visual representation of the fragrance or flavor composition may be created by assembling the graphical representations of at least two selected ingredients. For example, contiguous rectangular blocks may be assembled, so that there are no gaps between them, to provide an aesthetically pleasing display. This provides an alternative visualization of the fragrance or flavor composition and thereby another impression of the fragrance or flavor composition being created.

Optionally, the surface areas of the pictograms are proportional to the olfactive contributions of the pertaining ingredients. This provides a more detailed impression of the fragrance or flavor composition.

The flavor or fragrance compositions created according to the method of the present invention are advantageously stored in the database. It is also possible to store fragrance or flavor compositions otherwise generated in the database. By storing complete compositions (or grouped or linked ingredients as set out above) in the database, it is possible to use them as a starting point for a subsequent new composition or compare several compositions.

In one embodiment, two or more different fragrance or flavor compositions are displayed in the olfactive design space, thereby allowing a comparison of the ingredients used therein and their respective olfactive contributions and or quantities.

The output device is arranged to produce a sample of the composition. In one embodiment, the processor prepares a production file comprising a list of the selected ingredients and the respective quantities, and sends the file to an output device, such as a sampling automat, which output device stores a nominal quantity of each ingredient. The output device may execute the production file by taking up the selected quantities of the selected ingredients and combining them in order to obtain the fragrance or flavor composition.

The production file may be executed on site or may be sent to a sampling automat which is off-site. This allows for immediate preparation of the composition, both at the place of creation as well as at a co-worker's or customer's site.

The sampling automat is typically provided with a plurality of ingredients (preferably all ingredients) and is able to prepare a sample of the fragrance or flavor composition by taking up the quantity of each ingredient indicated in the production file and mixing it with the other ingredients.

The fragrance or flavor composition may be prepared as a solid or a liquid or it may also be vaporized in a VAS™, if desired. In one embodiment, the fragrance or flavor composition is filled into a recipient. Alternatively or in addition, the fragrance or flavor composition is vaporized.

A system according to a preferred embodiment of the present invention may comprise a terminal as defined hereinbefore, an output device to produce the samples and a database of ingredient information. The output device may be local or remote. In either case it may be accessible via communication protocols. The database may be provided locally as part of the terminal, or remotely, for example on the cloud, and accessed via an application running on a server. Equally, the terminal may execute a client part of processing and be linked to a backend which may be remote, for example on the cloud. The processing may be divided between the cloud and the terminal in any appropriate manner. At one extreme, the processor at the terminal simply passes all the information to the cloud for processing and uses the results. For example, the conversion from olfactive contribution to quantity by the processor at the terminal may use a look-up functionality at a server on the cloud. In a preferred modality, the conversion is carried out at the terminal and the quantity saved to the database.

A computer program according to preferred embodiments of the present invention may comprise any combination of the apparatus and method aspects. Methods or computer programs according to further embodiments may be described as computer-implemented in that they require processing and memory capability.

The apparatus (terminal or system) according to preferred embodiments is described as configured or arranged to, or simply "to" carry out certain functions. This configuration or arrangement could be by use of hardware or middleware or any other suitable system. In preferred embodiments, the configuration or arrangement is by software.

Thus according to one aspect there is provided a program which, when loaded onto at least one terminal, configures the terminal to become the terminal according to any of the preceding terminal definitions or any combination thereof.

According to a further aspect there is provided a program which, when loaded onto the at least one terminal, configures the at least one terminal to carry out the method steps according to any of the preceding method definitions or any combination thereof.

In general the computer may comprise the elements listed as being configured or arranged to provide the functions defined. For example, this computer may include memory, processing, a user interface and a network interface.

The invention may be implemented in digital electronic circuitry, or in computer hardware, firmware, software, or in combinations of them. The invention may be implemented as a computer program or computer program product, i.e., a computer program tangibly embodied in a non-transitory information carrier, e.g., in a machine-readable storage device, or in a propagated signal, for execution by, or to control the operation of, one or more hardware modules.

A computer program may be in the form of a stand-alone program, a computer program portion or more than one computer program and may be written in any form of programming language, including compiled or interpreted languages, and it may be deployed in any form, including as a stand-alone program or as a module, component, subroutine, or other unit suitable for use in a data processing environment. A computer program may be deployed to be executed on one module or on multiple modules at one site or distributed across multiple sites and interconnected by a communication network.

Method steps of the invention may be performed by one or more programmable processors executing a computer program to perform functions of the invention by operating on input data and generating output. The apparatus of the invention may be implemented as programmed hardware or as special purpose logic circuitry, including e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions coupled to one or more memory devices for storing instructions and data.

The invention is described in terms of particular embodiments. Other embodiments are within the scope of the following claims. For example, the steps of the invention may be performed in a different order and still achieve desirable results. Multiple test script versions may be edited and invoked as a unit without using object-oriented programming technology; for example, the elements of a script object may be organized in a structured database or a file system, and the operations described as being performed by the script object may be performed by a test control program.

Elements of the invention have been described using the terms "processor", "user input means", etc. The skilled person will appreciate that such functional terms and their equivalents may refer to parts of the system that are spatially separate but combine to serve the function defined. Equally, the same physical parts of the system may provide two or more of the functions defined. More than one functionality may be provided by a functional component. For instance, the user input means may allow user input via a touchscreen, using an internet link to another user location, and using a keyboard and/or mouse.

For example, separately defined means may be implemented using the same memory and/or processor as appropriate.

The features of the invention embodiments described above, as well as other features and advantages, will become better understood with reference to the following description of particular embodiments of the invention and/or with the help of the attached figures, given as examples only, in which.

GENERAL EMBODIMENT

Figure 1:
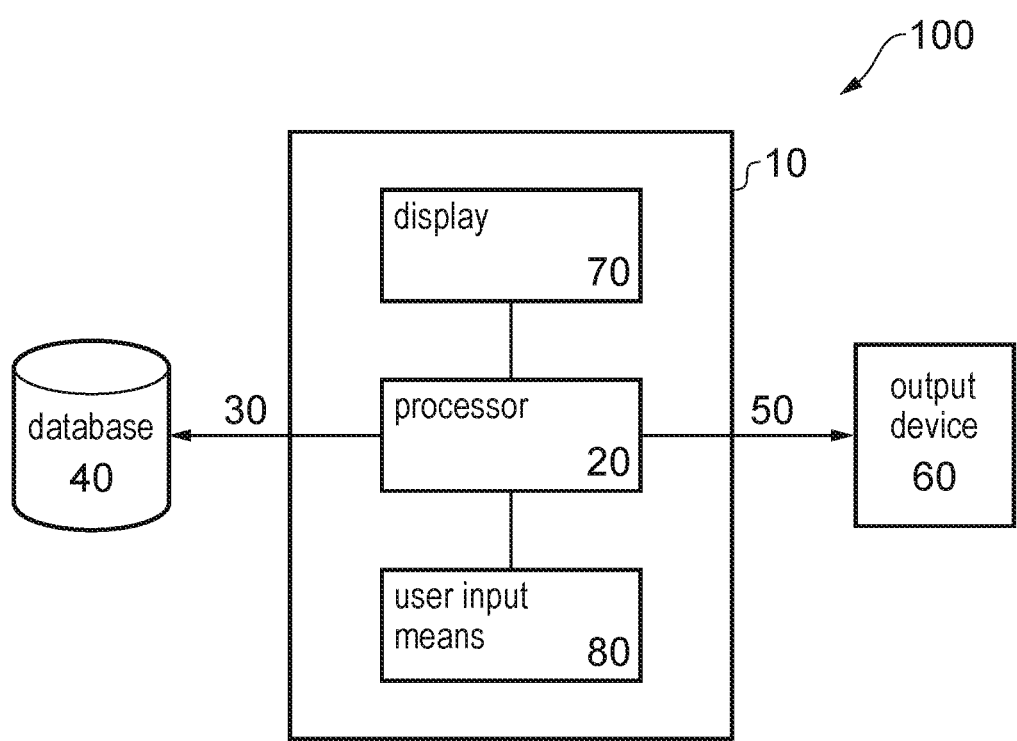
FIG. 1 is a block diagram of a computer terminal according to an embodiment.

FIG. 1 shows a computer terminal 10 arranged to allow a user to produce a fragrance or flavor composition. The terminal includes a processor 20, a database connection 30 to a database 40 storing ingredients, an output connection 50 to an output device 60 configured to produce a sample of the composition, a display 70 and a user input means 80. The processor is configured to accept selection of ingredients from the database via the user input means. The user input means may include a touchscreen also acting as the display and/or other local or remote means as explained hereinbefore.

The processor adds pictograms representing the selected ingredients to an olfactive design space on the display. The size of the pictogram for each selected ingredient represents that selected ingredient's olfactive contribution to the composition. The processor also converts, for each selected ingredient, its olfactive contribution to a corresponding quantity of the ingredient. The quantity is often expressed as a percentage of the full composition (and is expressed in absolute terms at the latest at the output stage). As for the other steps carried out by the processor, conversion can be local, or use input from an application running on the cloud. When the user requests a sample of the composition via the input means, the processor instructs the output device to dispense the corresponding quantity (according to the respective proportions) of the selected ingredients.

Figure 2:
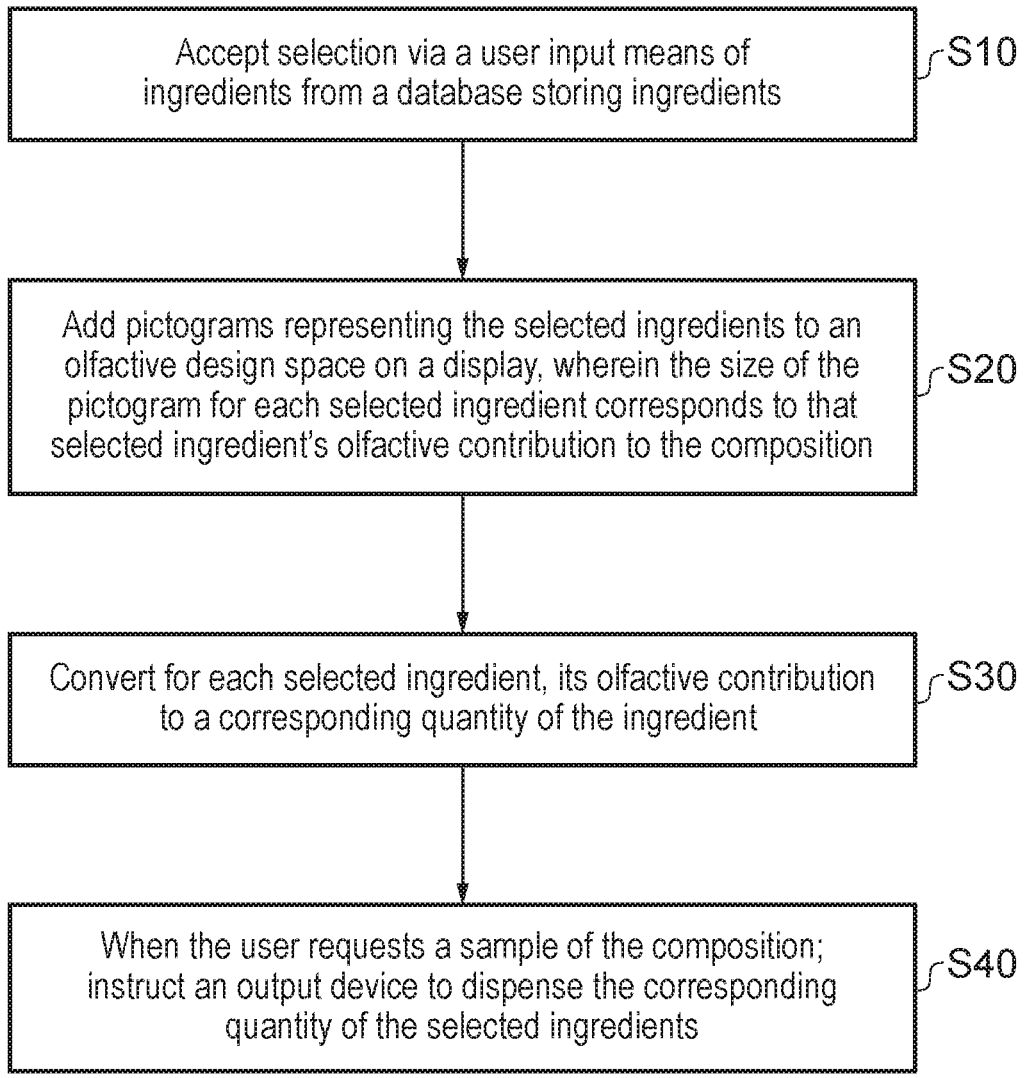
FIG. 2 is a flowchart of an embodiment.

FIG. 2 is a flowchart of a general method embodiment which is carried out by a processor (potentially in communication with remote processing capability). In step S10, the processor accepts selection via a user input means of ingredients from a database storing ingredients. In S20, the processor adds pictograms representing the selected ingredients to an olfactive design space on a display. The size of the pictogram for each selected ingredient corresponds to (represents or depicts) that selected ingredient's olfactive contribution to the composition. That is, the relative sizes of the pictograms indicate the relative olfactive contributions of the ingredients.

In S30, the processor converts for each selected ingredient, its olfactive contribution to a corresponding quantity of the ingredient; and, in S40, if and when the user requests a sample of the composition (via the user input means), the processor instructs an output device to dispense the corresponding quantity of the selected ingredients.

Figure 3:
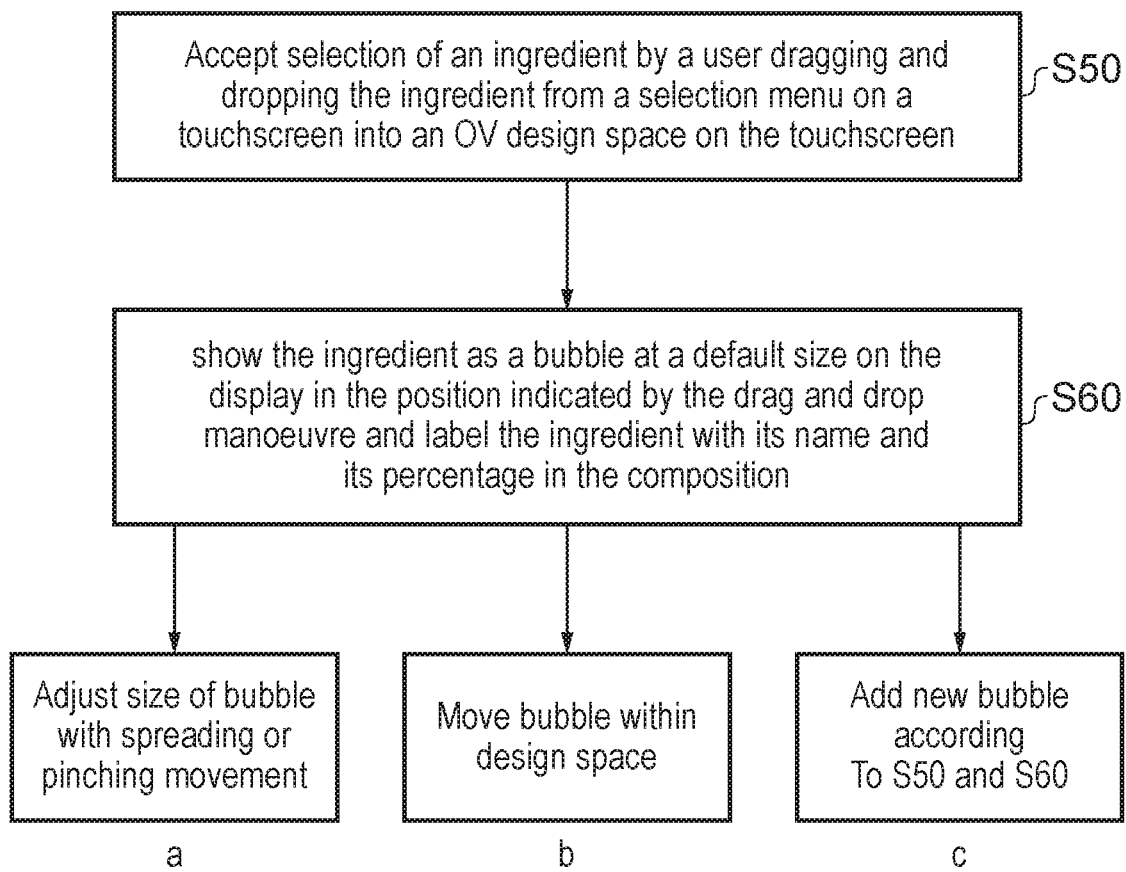
FIG. 3 is a flowchart of another embodiment.

FIG. 3 shows a basic user method of composition design when the invention is implemented in a way that facilitates ease of interaction with the computer via User Interface UI functionality of a touchscreen. In S50, the processor accepts a user drag-and-drop of an ingredient from a selection menu into an olfactive design space of a touchscreen. This can be a remote input via the user input means for a remote connection, or a local input from a touchscreen at the local terminal. In S60 the processor causes the display to show the ingredient as a circular pictogram (or "bubble") at a default size on the display in the position indicated by the end of the drag-and-drop manoeuvre and labels the ingredient with its name and its percentage in the composition, which is 100% for a first ingredient. The pictogram is the same colour as the ingredient's representation in the selection menu, which is chosen to represent the ingredients character (e.g. brown for woody ingredients and yellow for citrus ingredients etc.).

The next step can be any of several possibilities. In a) the size of a bubble is adjusted using a spreading of pinching movement of the fingers of a user (the same or a different user, whether local or remote). The percentage of all the bubbles on the display is adjusted accordingly using a conversion to volume or weight or parts carried out entirely locally or using external input, for example from the cloud. In b) a bubble is moved within the design space, perhaps to be closer to a similar ingredient, or to make room for a new ingredient. In c) a new bubble is added in the same way as before, adjusting the percentage of the other bubble(s) as necessary. The steps of a) b) and c) may be repeated in any order, by any number of different users, remote and local, until a fragrance or flavor composition has been created.

As previously noted, although a touch screen is the preferred embodiment, the same operations can be made by a mouse, keyboard, a trackball or any other command input device.

Figure 4:
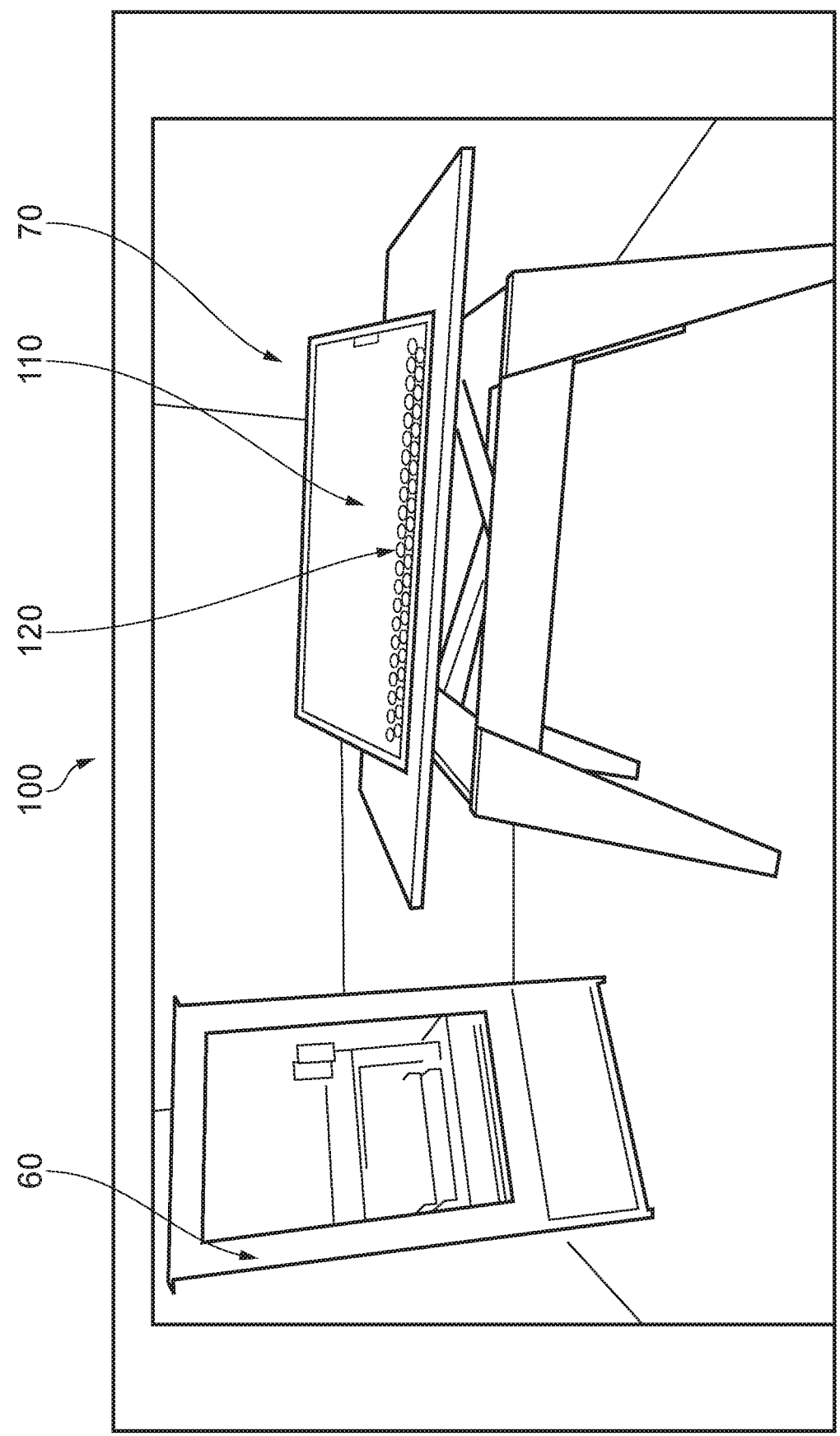
FIG. 4 is a view showing the layout of a system according to an invention embodiment.

FIG. 4 shows the layout of a system 100, including a touchscreen 70 acting as the display and as one user input means 80. The output device 60 is depicted to the left at the same location. A keyboard and mouse and a processor, links to external processing capability and links between the parts are not shown, for simplicity. The touchscreen is displaying a selection menu 120 in a first section, to the bottom of the screen and an olfactive design space 110 in a second section in the main part of the screen. The design space is empty, but the selection menu includes two rows of circular icons/pictograms each representing an ingredient or predefined group of ingredients that may be selected to create a fragrance or flavor composition.

Figure 5:
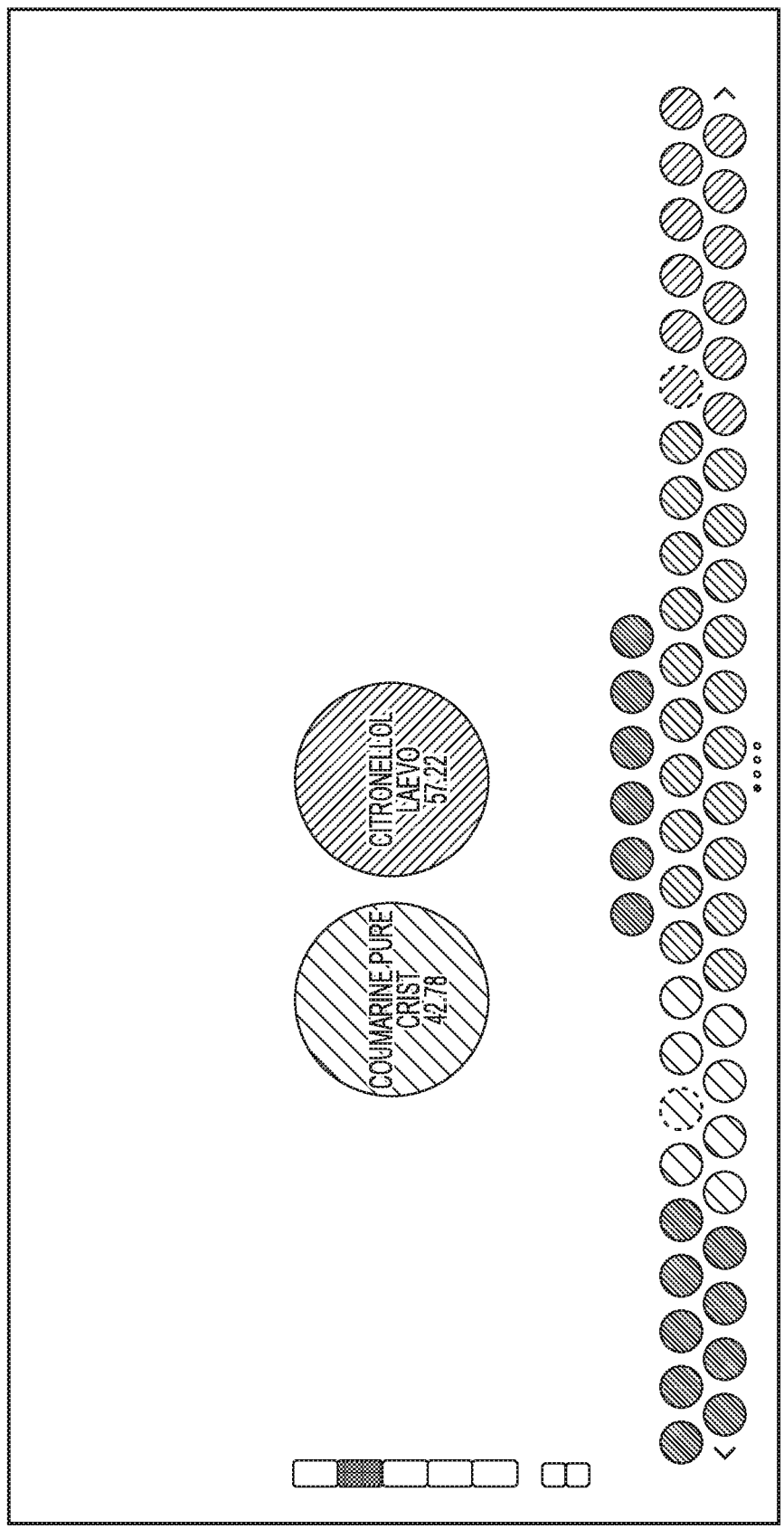
FIG. 5 is a view of a screen showing two selected ingredients with the same olfactive contribution.

FIG. 5 is a view of the screen alone. Each available ingredient is represented by a pictogram in the selection menu. The available space is too small to accommodate all the ingredients, and only some of the ingredients are visible at a time. A user can request the display of the remaining pictograms, e.g. by sliding left or right to move along the list of ingredients using the arrows shown.

The ingredient pictograms (whether in the design space or in the selection menu) are color coded i.e. the pictograms of ingredients belonging to the same odor family are illustrated by the same or a similar color. For example, pictograms of ingredients belonging to the family "Herbal" may have a light green background. In the same manner, pictograms of ingredients belonging to the family "Woody" may have a brown background. After selection, the colour of an ingredient is darkened in the selection menu. In this display, there is a set of 6 icons above the selection menu, which provide different options for display of the selection menu.

In FIG. 5, the user has selected two ingredients by "moving" them from the selection menu to the design space to add them to the composition being created. The original olfactive contribution value of each ingredient is set to 1000000 or another default value. This means that, without adjustment, the olfactive contribution of each selected ingredient to the composition is equal and each ingredient has the same size pictogram. The number below the name shown in FIG. 5 and elsewhere refers to the relative quantity of the ingredient in the composition by weight or volume or by parts. Here, the percentage of the ingredient coumarine is 42.78% and the percentage of the ingredient citronellol is 57.22%, indicating that a smaller amount of coumarine than citronellol is required to make the same olfactive contribution.

FIG. 5 also depicts icons to the left of the screen which can be used to change between an olfactive contribution view (selected), a quantity view (top icon), a linking function described below, and a tableau or graphical view, as well as undo and re-do functionality. The olfactive contribution view may be toggled between an absolute view and a relative view of the olfactive contribution.

Figure 6:
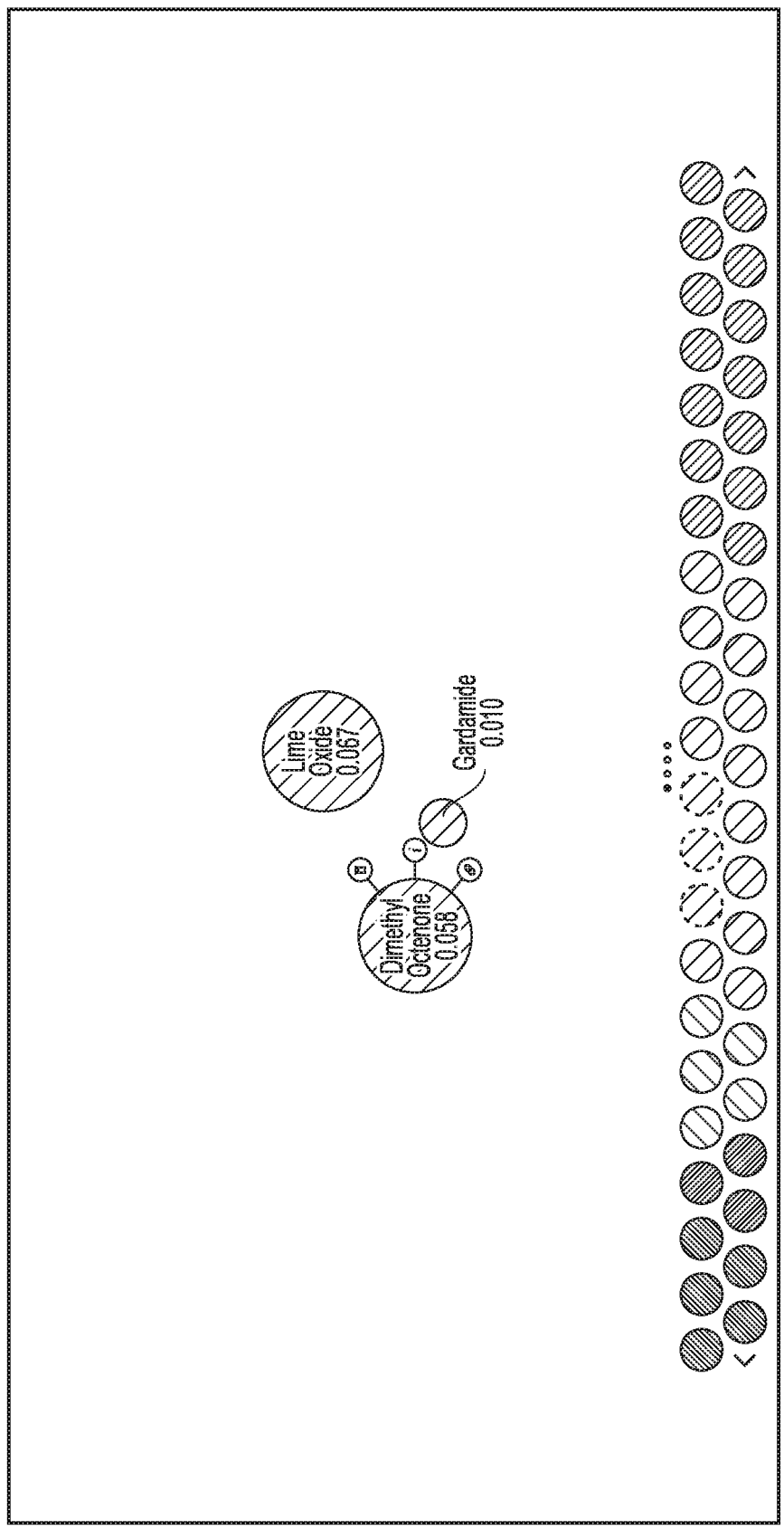
FIG. 6 is a view of a screen showing three selected ingredients, one with a different olfactive contribution.

In FIG. 6, the user has selected three different ingredients and changed the relative olfactive contributions of the ingredients by resizing one from the initial default size, as previously explained, so that it is smaller. One selected ingredient (dimethyl octenone) has been highlighted for further investigation with options to delete, see additional information, or link the ingredient to one or more other ingredients, as shown next to the pictogram and to the right of the screen.

Once the ingredients have been selected and the olfactive contribution values have been adjusted as desired, the user can initiate the preparation of the composition, e.g. by means of a sampling automat such as the one shown in FIG. 4. To this end, the olfactive contribution value of each selected ingredient is converted into a respective quantity of said ingredient to be used, based on a respective conversion factor.

The conversion factor of each ingredient is stored in an ingredient record pertaining to said ingredient. The conversion factors typically vary from ingredient to ingredient and are not necessarily linear over the whole olfactive contribution range.

As an example:

| Ingredient: | I1 | I2 | I3 |
|---|---|---|---|
| Target Olfactive Contribution Value: | 1 | 2 | 4 |
| Quantity Corresponding to Olfactive Contribution Value of 1000000: | 15 mg | 180 mg | 300 mg |
| Correlation: | linear | linear | polynomial |
| Amount to be Used in the Composition: | 15 mg | 360 mg | 2400 mg |

Figure 7:
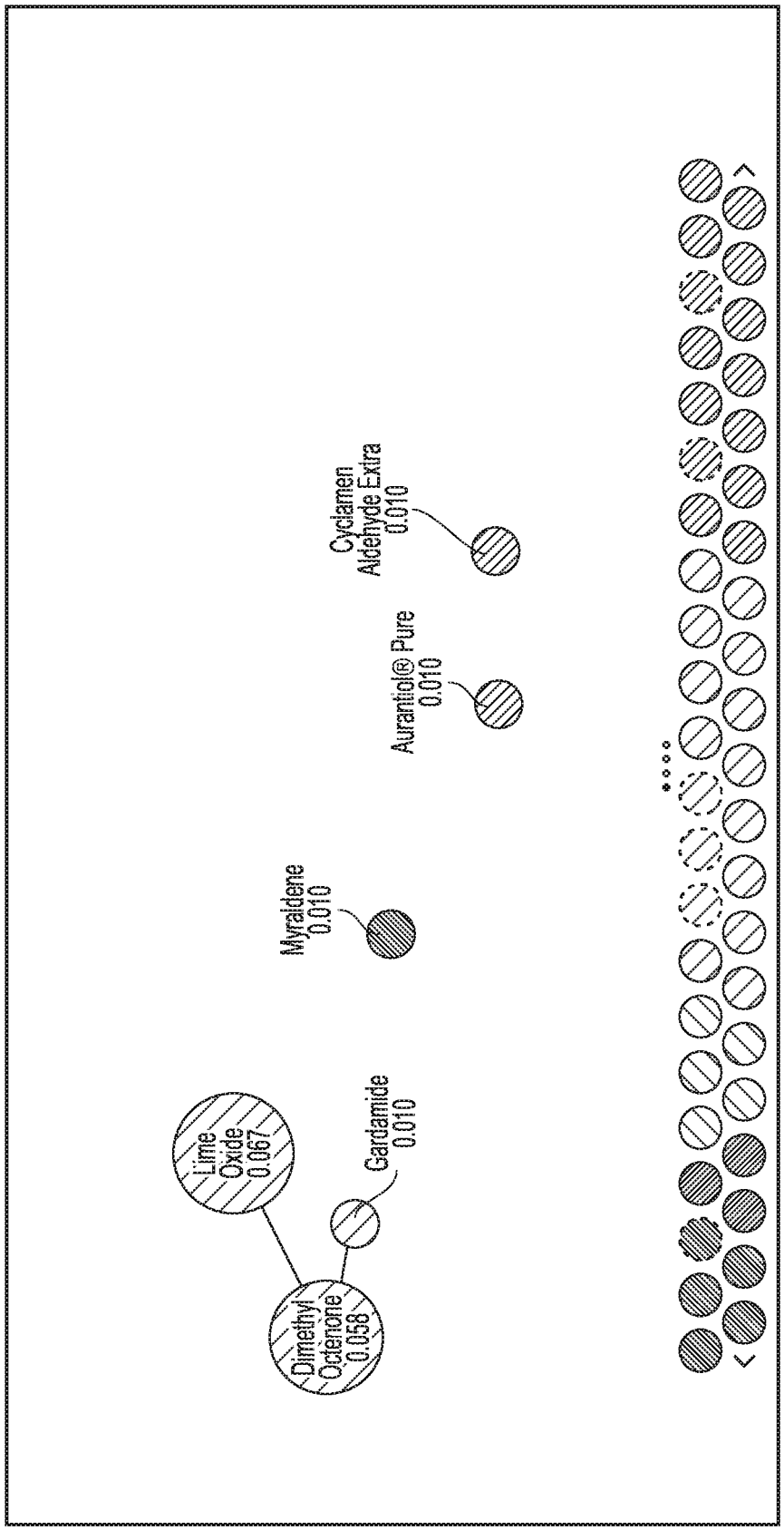
FIG. 7 is a view of a screen showing multiple ingredients, with three ingredients linked together.
Figure 8:
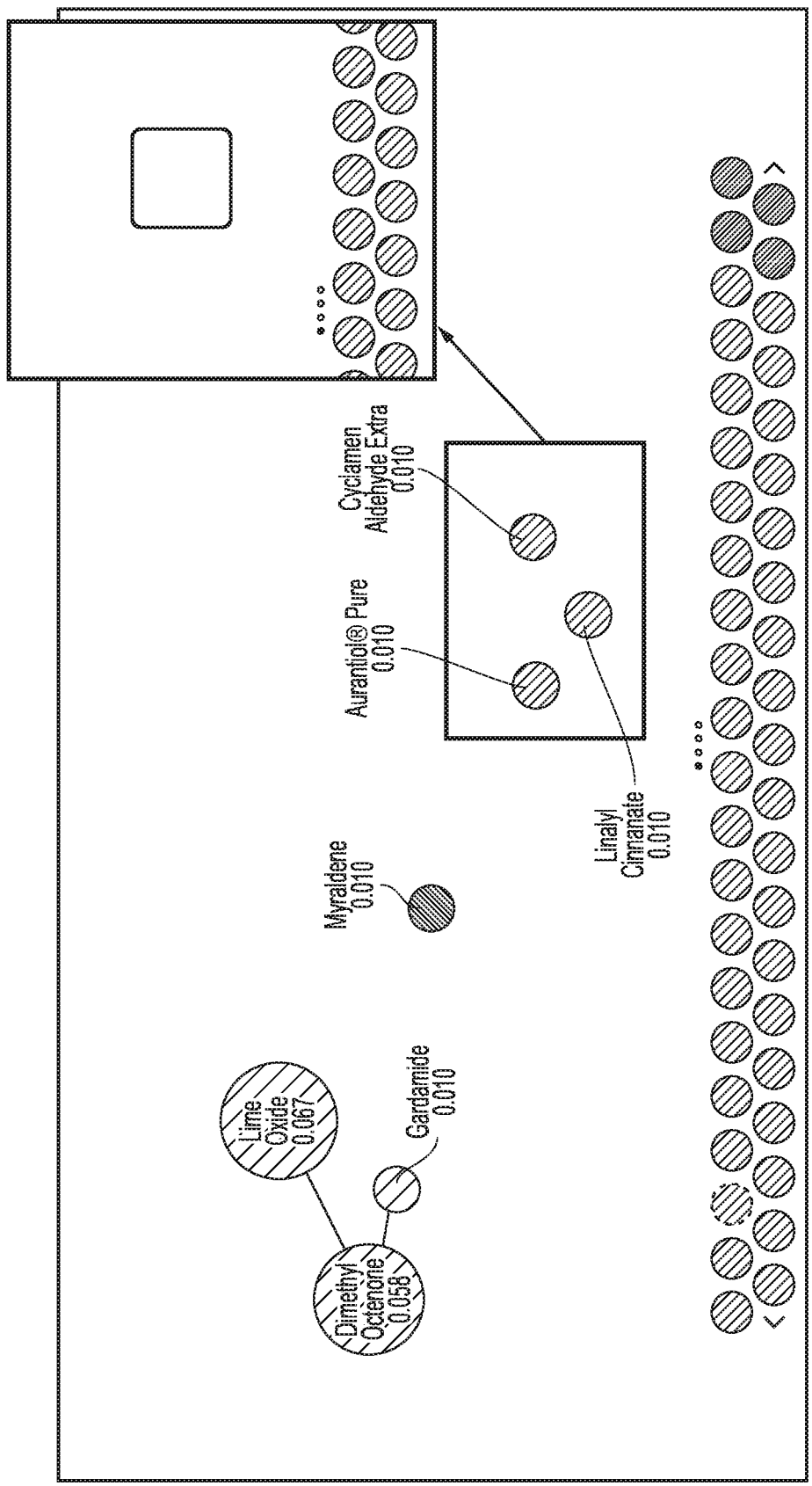
FIG. 8 is a view of the same screen with a development to group three different ingredients together to form a single entity.

FIGS. 7 and 8 illustrate the linking of ingredients. In FIG. 7, three ingredients have been linked. Linking two (or more) ingredients can just be a visual aid to the user, with no sizing effect or may mean that an adjustment to a linked ingredient is automatically applied to all other ingredients linked with said ingredient. For example, if the olfactive contribution value of one ingredient is adjusted from 1 to 2, then the olfactive contribution value of the other(s) is automatically adjusted in the same ratio, i.e. also doubled.

FIG. 8 shows that a different group of ingredients has been combined to form a single entity, which may, for example, be added as a new ingredient in the selection menu, or used in the same proportions in a new composition.

The ingredient record may also comprise a concentration limit defining a maximum concentration of the respective ingredient. This maximum concentration may be caused by stability or formulation issues, for instance, but may also be due national legislation limiting the ingredient's use in a particular country, by a customer's requirements or by other market constraints.

Figure 9:
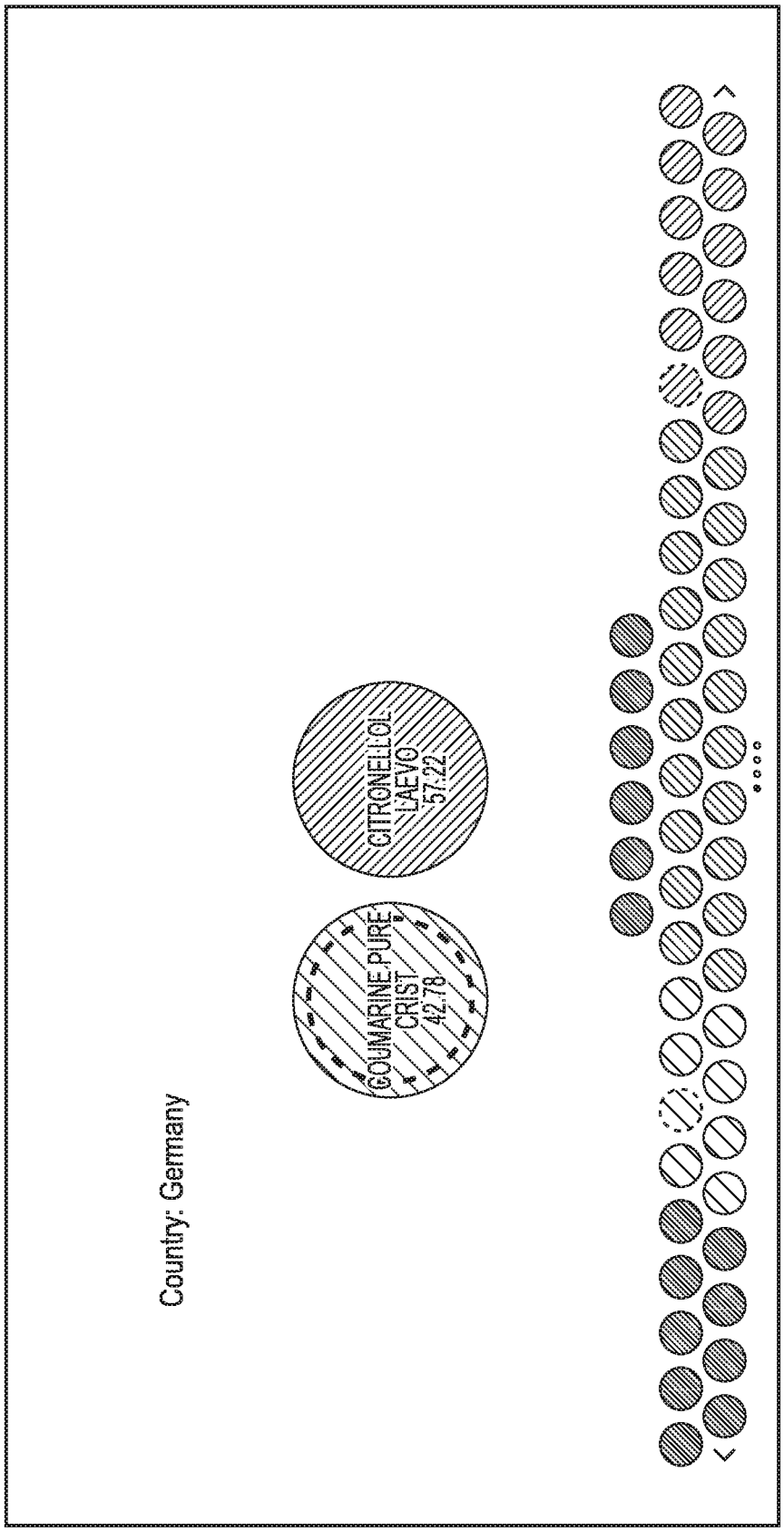
FIG. 9 is a view of a screen showing two selected ingredients, in which a concentration applicable in Germany has been introduced.

In order to check the compliance with a particular country, the user defines a target country, e.g. Germany (see example of FIG. 9). The concentration of each selected ingredient in the composition is calculated based on the quantity corresponding to the target olfactive contribution value and then compared to the maximum concentration stored in the ingredient record. In case the concentration of an ingredient exceeds the authorized concentration limit, the pictogram of said ingredient is highlighted. Additionally or alternatively, the maximum olfactive contribution value corresponding to the maximum concentration may also be displayed within the pictogram, as shown in the FIG. 9. The user can then reduce the olfactive contribution value. In an analogous fashion, it is also possible to address a certain customer's requirements or other market constraints.

The display may further be changed to a graphic or tableau representation related to the pertaining ingredient. This graphic representation may be an illustration of each or most or some of the ingredients, for example an image or a color, helping to imagine the odor or aroma of the ingredient, respectively.

Figure 10:
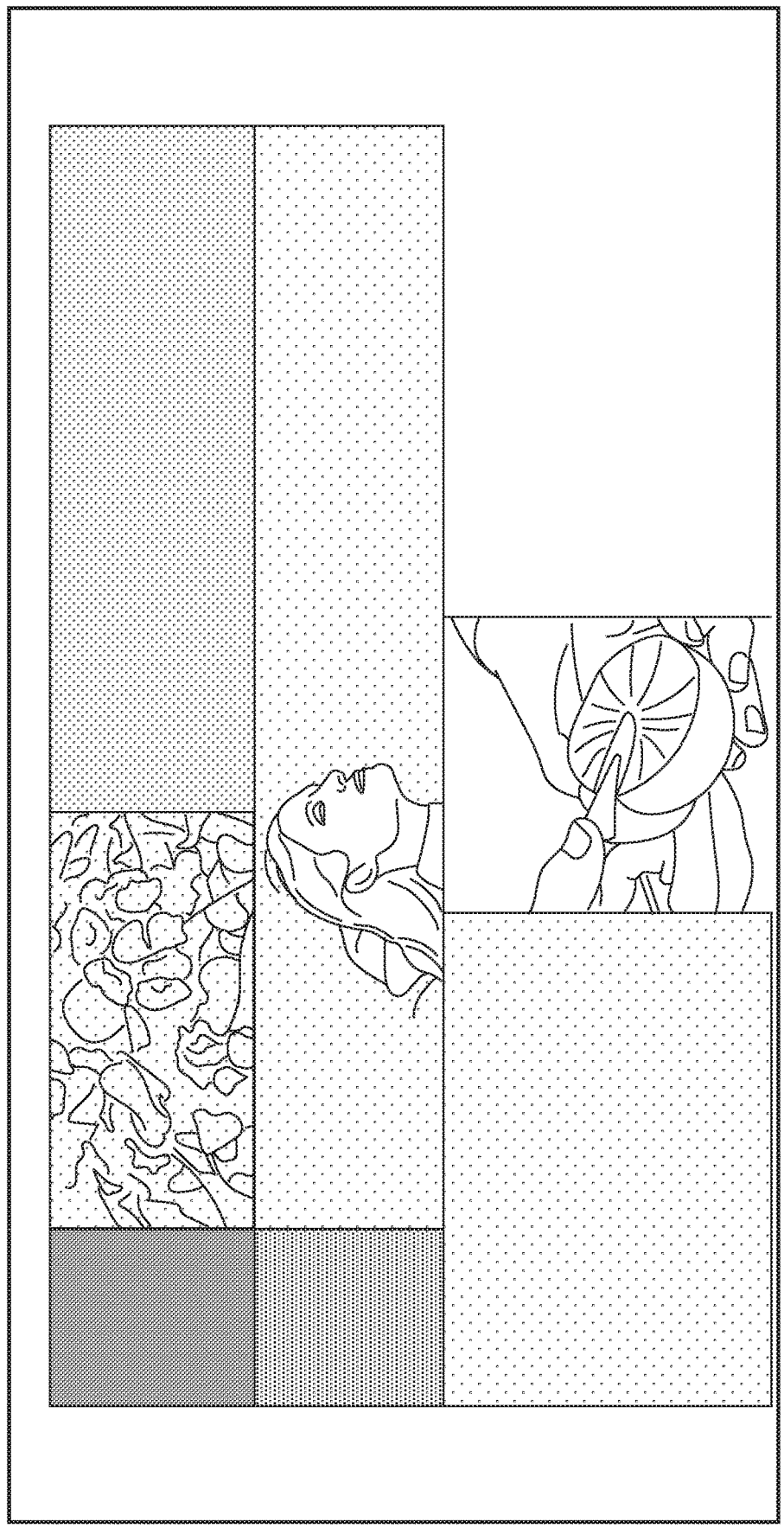
FIG. 10 is a view of a screen with a graphic/tableau representation.

An example of the graphic representation is illustrated in FIG. 10. The graphic representations of the main ingredients contributing to the fragrance or flavor composition are placed on the screen. They are shown here as rectangular contiguous blocks. Preferably, the surface areas of the graphic representations are proportional to the contribution values of the respective ingredients. The surface areas can be adjusted by user input, and the images and colors changed in the same way. For example, there may be several images and one or more colors stored for each ingredient, and the user may be able to select one of these options.

Figure 11:
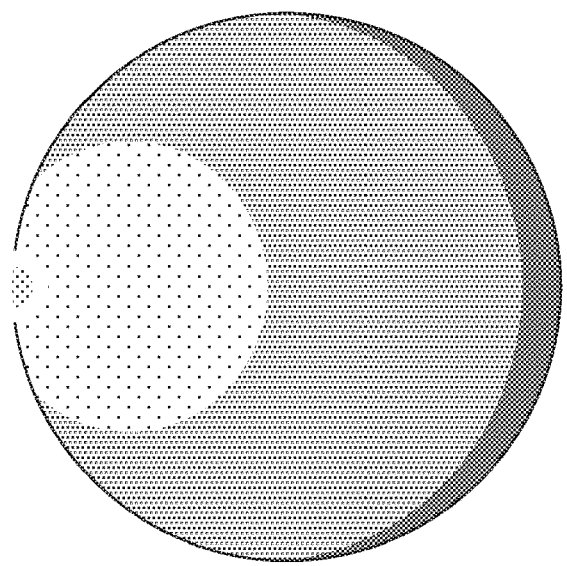
FIG. 11 is a view of a screen illustrating an alternative sphere representation of a fragrance or flavor composition with a sphere representing one composition.

FIG. 11 illustrates an alternative representation of a fragrance or flavor composition: the sphere represents one composition, different colors used in the sphere representing different ingredient families, and the contribution of each color representing the contribution of said ingredient family to the overall impression of the composition.

Figure 12:
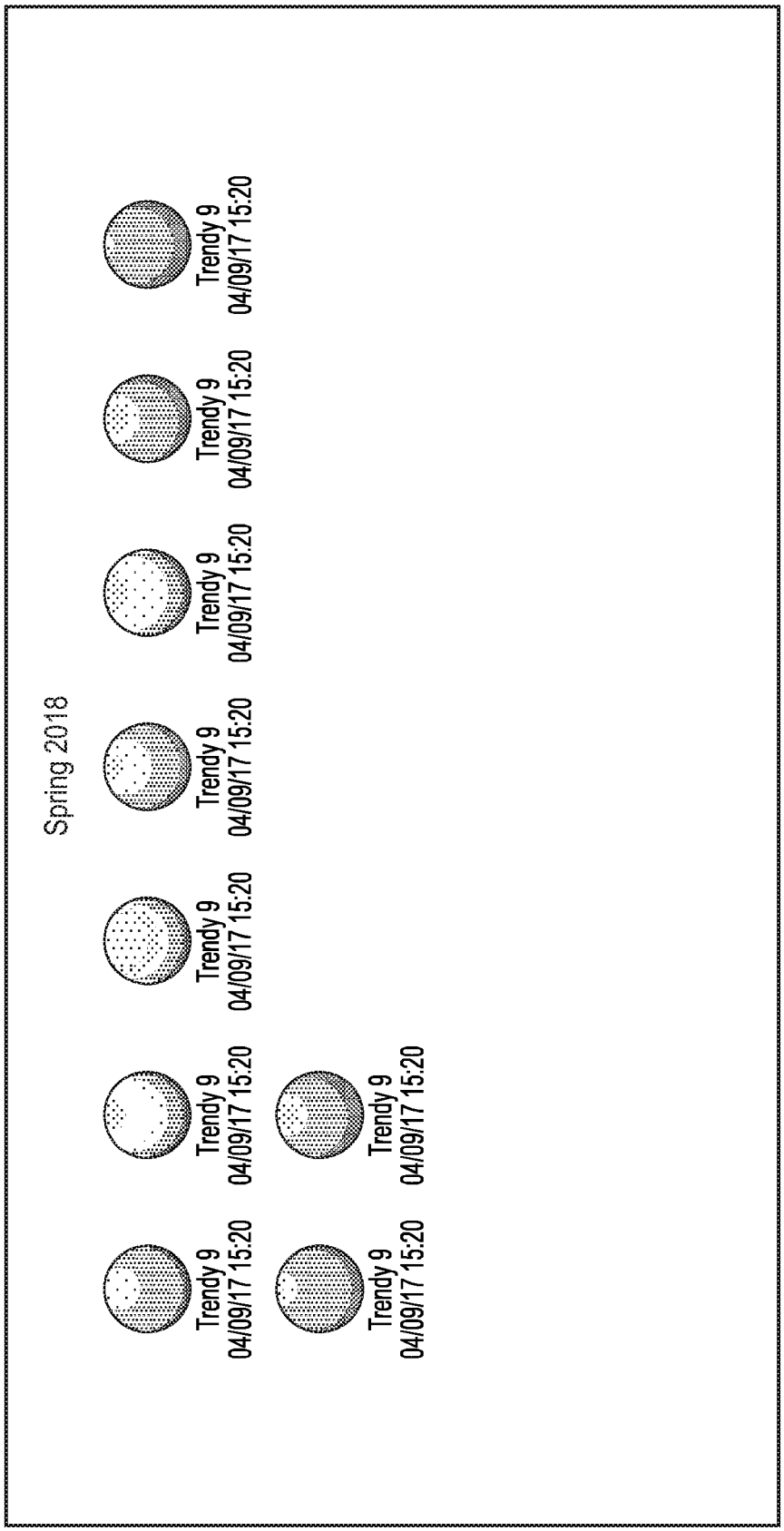
FIG. 12 is a view of a screen with the sphere representation and including a number of different compositions.

As an example: a fragrance composition comprising a citrus, a fruity and a woody ingredient may be represented by a sphere having yellow (citrus), orange (fruity) and brown (woody) areas in the respective contribution ratios. By displaying the spheres of two different compositions side by side, a comparison of the two is straightforward. Also, it is possible to view the development of different versions of a composition, as shown in FIG. 12. The different spheres represent different versions of "Trendy" that have been created at different times.

Calculation of the Display Size of Selected Ingredient Pictograms

The display may be switched according to user input (for example using "buttons" on the edge of a touch screen) between the olfactive contribution representation and a quantity representation/mode. The olfactive contribution representation (also referred to as the odor value or OV representation/mode due to its close link to odor value) can be in linear or non-linear format. This non-linear format can allow easier understanding of compositions in which some pictograms are many factors bigger than others.

Equations for the radius (in pixels) of a circular pictogram in the different representations are as follows:

Quantity Visualisation:

$$r = \sqrt{q \times scaleCoef} * base Radius$$

Linear OV Visualisation:

$$r = OVI \times scaleCoef \times baseRadius \times OVIRadiusScale$$

Non-Linear OV Visualisation:

$$r = \sqrt{OVI \times scaleCoef} \times \log baseRadius$$

There are two common variables in the calculations for both OV and quantity visualization.

$$scaleCoef \in [2; +\infty]$$

The scale coefficient is a dimensionless variable of between 2 and positive infinity and is a scaling variable which may be adjusted, for example using + and − buttons on the screen, situated for example in the olfactory design space.

$$baseRadius = dimension X \times 0.03 \text{ and } \in [10; 70]$$

The basic radius is a variable with pixel units and is deduced from the dimension X in pixels of the screen multiplied by 0.03. The variable is between 10 and 70.

For the calculation of linear OV, the constant OVIRadiusScale is equal to $\frac{1}{1000}$ and used to avoid oversizing of the pictograms.

For OV visualisation, the OVI (Odor Value Index) acts as the olfactive contribution and visually represents the contribution of an ingredient into a composition:

$$OVI = q * OV$$

in which q is the quantity in absolute terms or in terms of concentration (the quantity of the ingredient as a ratio of the ingredient to the full composition either by volume or weight or by moles or molecules or any other suitable measure) and OV the Odor Value of the ingredient in question (and thus a constant).

Olfactive Contribution

Olfactive contribution, which is a measure of perceived strength of an aroma, may be quantified in a number of different ways. The olfactive contribution may be viewed as related to the odor value, which is determined by dividing the equilibrium headspace concentration (HS) of the fragrance ingredient by its odor threshold (OT).

$$\text{Odor Value} = HS/OT$$

The equilibrium headspace concentration of a fragrance ingredient is directly related to its partial vapor pressure p through the law of perfect gases:

$$HS = ((1000 * MW)/RT) * p$$

wherein HS is the equilibrium headspace concentration given in μg/l headspace, MW is the molecular weight of the fragrance ingredient given in g/mol, R is the gas constant (R=8.314510 J·mol$^{-1}$K$^{-1}$), T is the absolute temperature given in Kelvin (T=298.15 K at 25° C.), p is the partial vapor pressure given in Pascal, and the pre-factor 1000 accounts for the transformation of liter headspace into cubic meter headspace and of grams to micrograms. The equilibrium headspace concentration is typically measured at 25° C.

The equilibrium headspace concentration of a fragrance ingredient can be determined, for instance, by the following measurement:

500 mg of the test fragrance ingredient was added to a headspace container which was then sealed. The container was then incubated at constant 25° C. until the fragrance ingredient reached equilibrium between the gas and the liquid phase. A defined volume of this saturated headspace (usually 0.5-1 l) was trapped on a micro filter using poly (ethyl-vinyl-benzene-co-divinyl-benzene) porous material, for example Porapak® Q from Supelco, as sorbent. After filter extraction with an appropriate solvent (usually 30-100 ⎵ methyl tert. butyl ether), an aliquot of the extract was analyzed by gas chromatography (GC). Quantification was performed by the external standard calibration method. The concentration in the original headspace can be calculated (in terms of μg/l headspace) from the headspace volume sucked through the micro filter and the aliquot of the filter extract injected into the gas chromatograph. The final equilibrium headspace concentration value of a given test fragrance ingredient is obtained as the mean value of three independent measurements each.

Further information on the technique hereinabove described may be found in: Etzweiler, F.; Senn E. and Neuner-Jehle N., Ber. Bunsen-Ges. Phys. Chem. 1984, 88, 578-583.

The odor threshold of a fragrance ingredient can be determined, for instance, by either one of the two following measurements:

a) Olfactometer Odor Threshold (OT):

Using an olfactometer, the following steps were carried out to determine the odor thresholds of the fragrance ingredient.

The olfactometer functions on the principle of a linear dilution of a fragrance ingredient in a carrier gas. The quantity of fragrance ingredient displaced depends on its vapor pressure and the carrier gas flow. A constant flow of nitrogen, regulated by a flow regulator, carries the fragrance ingredient from a sample container to a mixing chamber. There, the carrier gas-odor mixture is diluted with odorless air. From the mixing chamber, one part of the diluted odorous air is allowed to flow via a fused silica capillary to the sniffing funnel. The flow rate through the capillary, which determines the dosage of odorous air from the mixing chamber into the sniffing funnel, depends on the opening of the valve, which can be regulated from 1 to 256 ml in binary steps. The final dilution of the odorous air sample occurs in the glass funnel by flushing permanently with odorless air at a flow rate of 8 l/min. Forced-choice triangle presentation is achieved by a special automated channel setting device where the fragrance ingredient delivering capillary enters in the sniffing funnel only in one position of a switch, whereas in two other positions the capillary is positioned outside the funnel and where the effluent is sucked away. After each trial, the channel setting is changed automatically and in a random order. The concentration is calculated from the fragrance ingredient's vapor pressure and from the dilution ratios that were applied in the olfactometer, assuming that vapor pressure saturation is achieved in the sample generator. As a control, the concentration is determined analytically by sampling a known volume from the capillary effluent into a headspace filter and by subsequent gas chromatographic quantitation of the fragrance ingredient in the desorption solution.

Each panelist (panel of 15 persons) starts sniffing at the olfactometer at a concentration level at which he perceives the fragrance ingredient at medium intensity. After three correct answers in three consecutive trials (or four correct ones of five trials) at the same level, stimulus concentration is decreased by a factor of two to the next lower level, and so on, until the panelist has reached his threshold level. The final threshold value of a given fragrance ingredient is obtained as the mean value of all individual threshold levels.

Further information of the technique hereinabove described may be found in chapter 6 of Neuner-Jehle, N. and Etzweiler, F., Perfumes: Art, Science and Technology; Müller, P.; Lamparsky, D., Eds; Elsevier Applied Science Publishers: London, 1991; pp 153-212.

b) GC Odor Threshold:

The odor threshold values were determined by gas chromatograph (GC) detection. Different dilutions of a tested fragrance ingredient were injected into a GC in descending order of concentration until a panelist failed to detect the respective substance at the sniffing port. Each panelist (panel of 5 persons) smelled blind and pressed a button upon perceiving an odor. If the recorded time matched the retention time, the sample was further diluted. The last quantity detected at the correct retention time is the individual odor threshold. The final threshold value of a given fragrance ingredient is obtained as the mean value of all individual threshold levels.

Further information of the technique hereinabove described may be found in chapter 6 of Neuner-Jehle, N. and Etzweiler, F., Perfumes: Art, Science and Technology; Müller, P.; Lamparsky, D., Eds; Elsevier Applied Science Publishers: London, 1991; pp 153-212.

In one embodiment of the present invention and as set out above, the olfactive contribution of a fragrance ingredient may be taken as:

$$\text{olfactive contribution} = \text{odor value} * \text{concentration, or}$$

$$\text{olfactive contribution} = \text{odor value} * \text{quantity}$$

Here the olfactive contribution is equal to the odor value multiplied by the quantity or by concentration—(the quantity of the ingredient as a ratio of the ingredient to the full composition either by volume or weight or by moles or molecules or any other suitable measure).

Alternatively the olfactive contribution may be determined according to the following formula:

$$\text{olfactive contribution} = \log(\text{odor value} * \text{concentration})$$

i.e. by multiplying the odor value of the fragrance ingredient by the concentration (typically indicated in wt/wt or vol/vol) of the fragrance ingredient in the fragrance composition and then taking the logarithm of the product. It has been found that the thus obtained valued correlates very well with the fragrance ingredient's actual olfactive contribution to the overall impression of the fragrance composition. Alternatively, a non-linear display coefficient may be used.

Alternatively, the olfactive contribution of a fragrance ingredient could also be determined according to one of the following formulae:

$$\ln(\text{odor value} * \text{concentration})$$

$$\text{concentration} * \log(\text{odor value})$$

$$\text{odor value} * \text{deposition coefficient}$$

$$\text{concentration} * \text{deposition coefficient}$$

$$\text{odor value} * \text{concentration} * \text{deposition coefficient}$$

$$\text{odor value} * \text{bloom impact}$$

The deposition coefficient is the percentage of a fragrance ingredient that deposits on a substrate in an application, based on the total amount of this fragrance ingredient present in the application. For instance, the application may be washing a substrate with a wash liquor containing the fragrance ingredient, or any other action where a substrate is exposed to a fragrance ingredient-containing product, such as conditioner, shampoo, shower gel, and the like.

The bloom impact is the perceived intensity of a fragrance composition at some distance from the source (for example 1 m) and within a short period of time, for example up to 1 minute, after the conditions at the source have changed. Changing the conditions at the source may include, for example, opening a container comprising a fragrance composition, applying a fragrance composition on a substrate, or diluting a consumer product containing a fragrance composition in water, more particularly in warm water. Blooming is a kinetic effect: it comes early in an application and has a finite, usually short life time, and a sensory effect related to a rapid change of the odorant concentration in the nose.

In the context of the present invention, the total olfactive contribution of a group of fragrance ingredients is the sum of the olfactive contributions of all fragrance ingredients forming said group.

Hardware and Software Implementation

Figure 13:
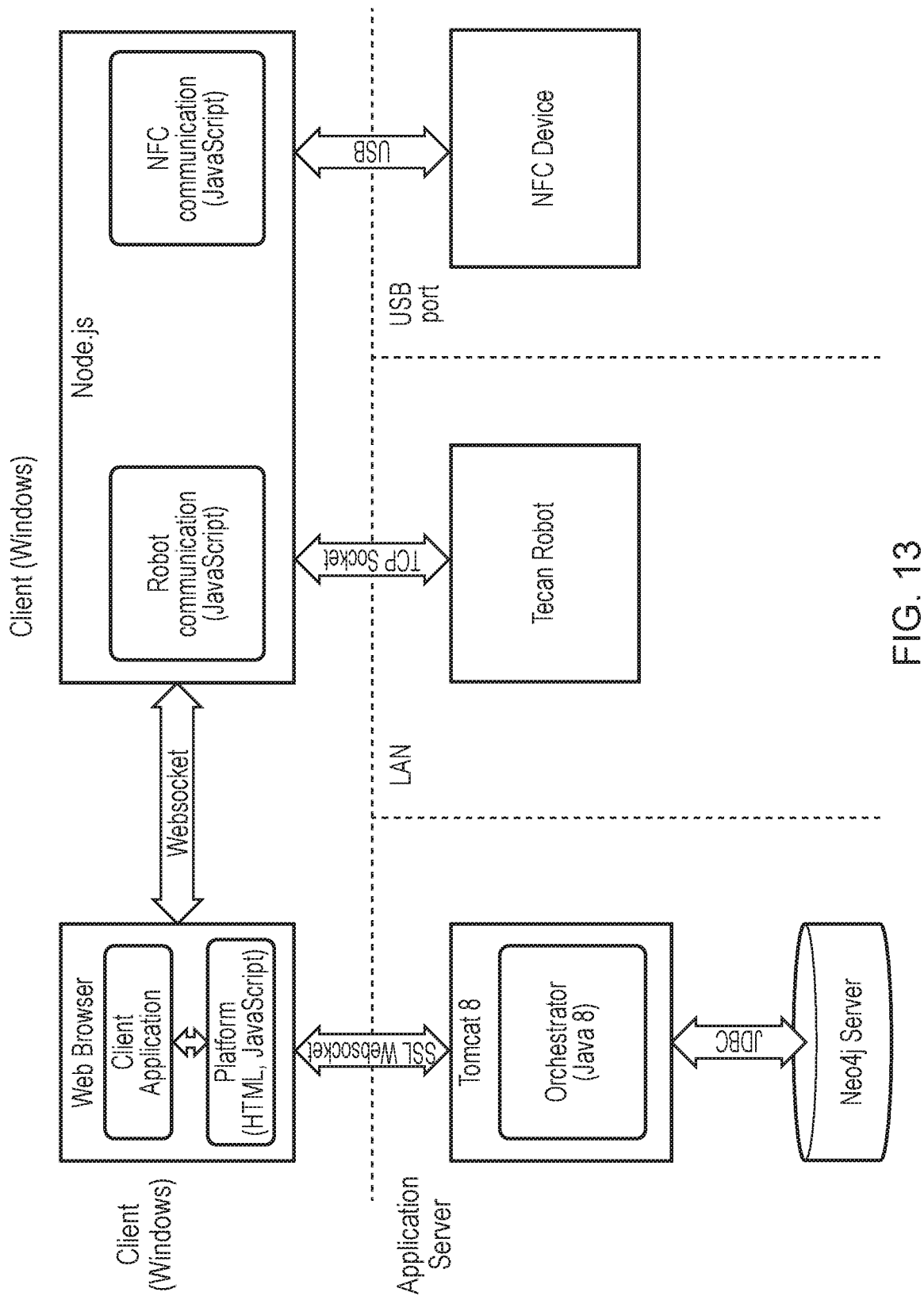
FIG. 13 is a conceptual diagram of a suitable application architecture.

FIG. 13 is a diagram of a suitable application architecture. Here the client application runs inside a web browser (Windows) running HTML and JavaScript. The platform is used to create the application. A runtime environment is provided for communication between the application on one hand and a robot (Tecan™ Robot) and a read and write labelling device (NFC (Near Field Communication) Device) for the samples on the other hand. The runtime environment is a JavaScript environment labelled as Node.js and executes JavaScript code that controls communication with the robot and NFC device.

The client application uses a Websocket communication protocol to communicate with Node.js and Node.js uses a TCP (Transmission Control Protocol) socket to handle communication on a Local Area Network (LAN) between Node.js and the robot. The NFC Device, on the other hand, is linked to Node.js via a USB port.

Turning back to the client application, the web browser communicates securely with an application server using an SSL Websocket (Secure Socket Layer). The application server itself is a Tomcat 8™ and houses an orchestrator running in Java 8. This orchestrator is the central workflow management for the whole system and provides an authentication, permission control and CRUD (Create, Read and Update, Delete) operations over data. The orchestrator is in an environment with limited access and can only be accessed using SSL Websocket or SSH-Secure SHell (with RSA (Rivest-Shamir-Adleman) key only).

The server is connected to a database storing all the application data (including the ingredient database) via a Java Database Connectivity (JDBC) Application Programming Interface (API), which is an industry standard for connectivity between the Java programming language and a database. The database itself is hosted on the Neo4j server, which is a graph platform.

Figure 14:
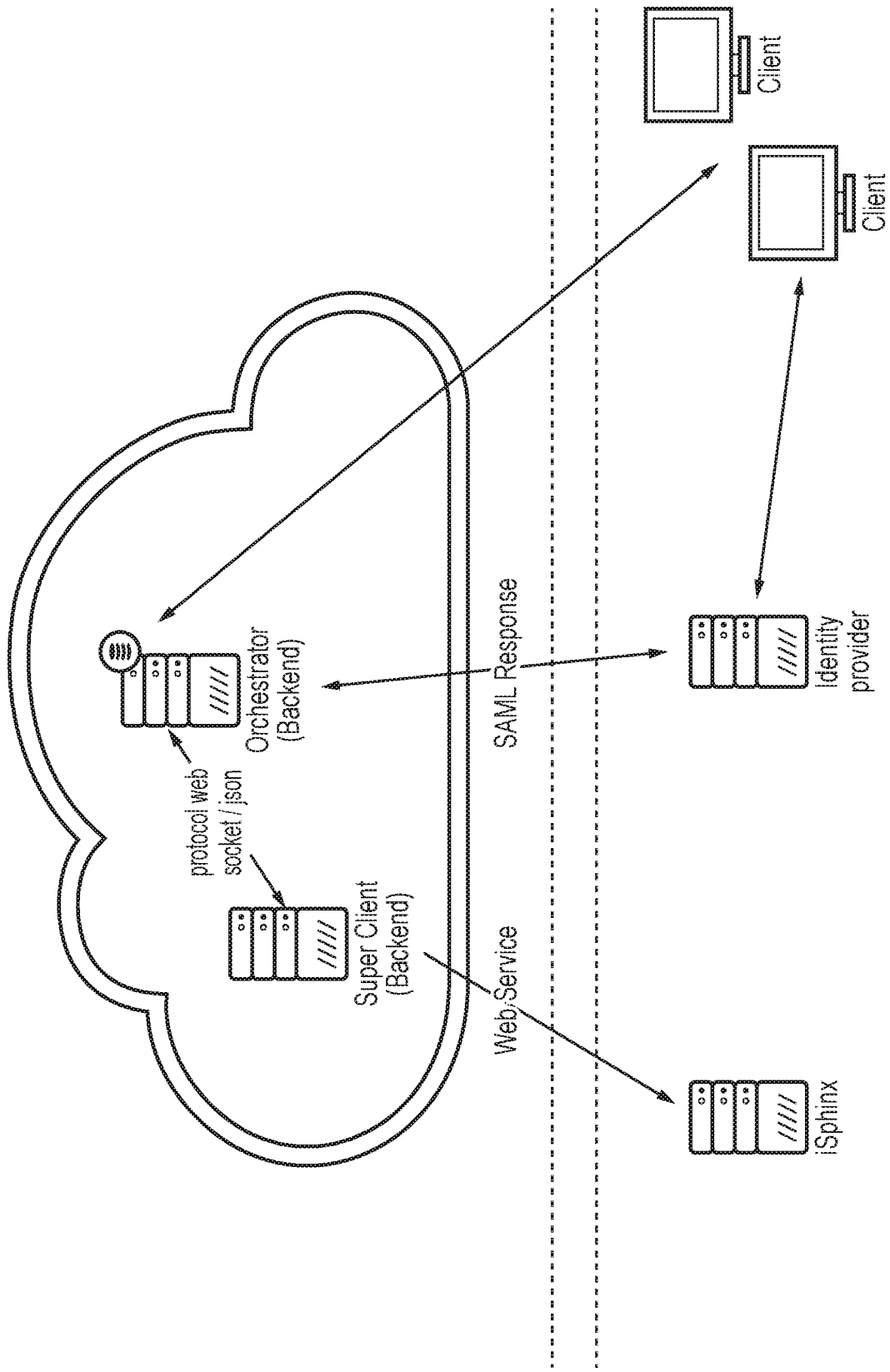
FIG. 14 is a conceptual diagram of a suitable server architecture.

FIG. 14 is a conceptual diagram of a suitable server architecture. Within the intranet of a company, there are one or more client terminals (which may be at different physical locations). Client terminals may also be situated outside of the intranet. An identity provider in the intranet authenticates the client terminals via an SAML (Security Assertion Markup Language) request. Also in the intranet, Lab Service is a service for providing larger scale samples. The intranet is connected to a cloud service via a DMZ (demilitarized zone). The cloud includes two backends, one for the client functionality, and one for the orchestrator. They are connected together by a Json (JavaScript Object Notation) web socket. The clients and the identity provider communicate with the backend through the orchestrator. For example, the client uses a web socket/Json protocol with an SAML login request and the identity provider uses an Http request and SAML response, with the orchestrator generating a token for the client to authenticate.

When a user adds an ingredient to a formula, a new "component" is created by the application. This component is linked to a formula and to the ingredient that the user is adding. The component's position is determined by the user's drop location on the screen. The initial amount is 0.1 for quantity mode and the quantity corresponding to an OVI of 1'000'000 in Odor Value mode. The size is computed by the client using relations defined previously. The size depends also on the device that is used. With the technology used, all the data is persisted in the database (DB) in real time.

The data for the conversion from the size on the screen to the quantity measurement (in percentage) that is displayed in the bubble is computed by the client as the amount ("q"), and saved in the DB as well as the position of the ingredient. The radius of the circle is computed by the client and depends on various parameters (such as the size of the screen, zoom level etc.)

Examples of invention embodiments include a method of creating a fragrance or flavor composition, comprising the steps of
- selecting a plurality of fragrance or flavor ingredients from a database of ingredients stored in a computer-readable form;
- displaying the selected ingredients on a user interface on a multi-dimensional olfactive design space, wherein each selected ingredient is represented as a pictogram, the size of which corresponds to the selected ingredient's olfactive contribution to the fragrance or flavor composition;
- optionally adjusting the olfactive contribution of at least one selected ingredient by adjusting the size of its pictogram;
- converting, for each selected ingredient, the olfactive contribution to a corresponding quantity;
- transmitting the information presented on the user interface as a digital signal instructing an output device to dispense defined quantities of the selected ingredients; and
- dispensing and mixing the selected flavor or fragrance ingredients to provide the fragrance or flavor composition.

A corresponding system is also provided.

If, having regard to the visual depiction on the olfactive design space, the designer wishes a particular ingredient to make a greater or smaller olfactive contribution, he can manually adjust the size of the respective pictogram using suitable user interface input means, such as physical manipulation of the user interface touch screen, or by mouse-click, keyboard-stroke, joy-stick movement, or the like.

As the creative process proceeds, the olfactive design space becomes populated with a plurality of pictograms that will be visually different, for example in terms of size. If desired, on a multi-dimensional design space, use may be made of color, to distinguish different olfactive families, for example. Furthermore, the olfactive design space can be configured such that the distance between pictograms is a measure of similarity or difference in respect of a particular attribute, such as odor or aroma character, as it would be perceived by a representative human population.

Together, the visually impactful depiction provides the user with information regarding the similarities and differences of the various ingredients employed in terms of their odor or aroma character, as well as their olfactive contribution to the overall impression of the fragrance or flavor composition, such that the representation can be thought of as a virtual olfactive fingerprint, or a digital display, of the fragrance or a flavor composition. This allows the user to avoid compositions that are unbalanced or do not achieve the desired effect, thereby minimizing the number of iterations necessary for creating the final fragrance or flavor composition, saving time as well as resources.

Furthermore, the more that a designer interacts with the creation tool, the more he is able to perceive the odor of his creation simply by looking at a digital depiction of it on the user interface.

As the pictograms represent the selected ingredients' olfactive contribution, rather than their concentration in a finished formula, it is much easier for the designer to visualize the created fragrance or flavor composition: The more prominent ingredients are immediately visible on the display, whereas the more subtle ingredients are also displayed in a more subtle way. This clearly enhances the user experience. It also facilitates the interaction of a designer with a customer by providing a visual impression of the fragrance or flavor composition.

The method according to the present invention may be carried out using the olfactive design space on a single user interface. However, the method may have particular application in co-creation processes wherein the collaborators or customers are in remote locations. Thus, provision can be made for the user interface, ingredient database and output device to communicate with connected devices, such as further computer terminals, or mobile devices such as tablets or even mobile phones. In this way, the method and apparatus provided is not merely a means of creating fragrance or flavor compositions, but is also creating an interactive experience for customers, which will stimulate and excite customers and promote their acceptance and preference for the created compositions.

The invention claimed is:

1. A computer terminal arranged to allow a user to produce a fragrance or flavour composition, the terminal comprising a processor, a database connection to a database storing ingredients, ingredient records pertaining to said ingredients, and one or more parameters associated with said ingredients, an output connection to an output device configured to produce a sample of the composition, a display, and a user input means; wherein:
the processor is configured to:
accept selection via the user input means of ingredients from the database;
add pictograms representing the selected ingredients to an olfactive design space on the display, wherein the size of the pictogram for each selected ingredient represents an olfactive contribution of each selected ingredient to the composition, wherein the olfactive contribution of each selected ingredient depends on an impact strength of each selected ingredient that relates to the one or more parameters associated with each selected ingredient;
convert, for each selected ingredient, the olfactive contribution to a corresponding quantity of the ingredient based on a conversion factor indicative of each selected ingredient; and, when the user requests a sample of the composition via the input means, to
instruct the output device to dispense the corresponding quantity of the selected ingredients.

2. The terminal according to claim 1, wherein:
the processor is configured to accept adjustment of a pictogram size by the user input means to change the olfactive contribution of a selected ingredient in the olfactive design space.

3. The terminal according to claim 1, wherein:
the display includes a selection menu displaying ingredients available for selection in the database, wherein the selection menu is provided in a different display location from the olfactive design space, and the processor is configured to show the selection menu and the olfactive design space simultaneously.

4. The terminal according to claim 1, wherein:
the user input means includes one or more of: a touchscreen acting as the display, a mouse or tracker ball or joystick, a voice input, a keyboard, and a remote input connection over a network.

5. The terminal according to claim 3, wherein:
the selection menu and the olfactive design space are displayed on a touchscreen.

6. The terminal according to claim 5, wherein:
the user input moves an ingredient from the selection menu into the olfactive design space by interaction with the touchscreen.

7. The terminal according to claim 1, wherein:
the processor is configured to allow user input freely adjusting the positioning of the selected ingredients within the olfactive design space.

8. The terminal according to claim 1, wherein:
the user input means accepts remote and local user input in production of the composition.

9. The terminal according to claim 1, wherein:
a first pictogram for a first selected ingredient is added at a default size and optionally, further pictograms for further ingredients are also added at the default size.

10. The terminal according to claim 1, wherein:
each of the selected ingredients contribute a fraction of the overall olfactive contribution of the fragrance or flavour composition, depending on the size assigned to the respective pictogram.

11. The terminal according to claim 1, wherein:
the processor is configured to accept user input to switch to an alternative view of the olfactive design space, in which each pictogram size represents another property, such as the quantity, concentration, or cost of the respective ingredient, or in which individual pictograms reduce or decrease in size in proportion to the relative olfactive contribution of ingredients to the overall impression of the composition over time.

12. The terminal according to claim 1, wherein:
the processor is configured to retrieve from the database and display to the user additional ingredient information including one or more of:
information relating to a maximum amount or concentration of an ingredient allowable, in dependence upon a target geographical use;
information relating to ingredients conforming to a target application for the composition;
an alternate ingredient recommended to be used in place of an ingredient; and
an associate ingredient recommended to be used in combination with an ingredient.

13. The terminal according to claim 1, wherein:
the processor is further configured to accept linking user input linking at least two of the selected ingredients into a group.

14. The terminal according to claim 1, wherein:
the processor is configured to accept user input to switch to a graphical display mode in which a graphical representation is used for each selected ingredient, and the processor instructs display of one block of the corresponding graphical representation on the display for each of the selected ingredients.

15. The terminal according to claim 10, wherein the processor is configured to display pictograms such that the sum of the olfactive contributions of all the selected ingredients adds up to 100%.

16. The terminal according to claim 13, wherein when the size of one of the pictograms of the linked ingredients is adjusted by the user, the processor is further configured to automatically adjust the size(s) of all the other pictograms of the linked ingredients so that they remain in the same proportions.

17. The terminal according to claim 1, wherein:
the one or more parameters comprise at least one selected from a vapor pressure of each selected ingredient and an odor detection threshold of each selected ingredient.

18. The terminal according to claim 1, wherein:
the conversion factor indicative of each selected ingredient is stored in the ingredient record of each selected ingredient.

19. A method in a processor allowing a user to produce a fragrance or flavour composition; the processor
  accepting selection via a user input means of ingredients from a database storing ingredients, ingredient records pertaining to said ingredients, and one or more parameters associated with said ingredients;
  adding pictograms representing the selected ingredients to an olfactive design space on a display, wherein the size of the pictogram for each selected ingredient represents an olfactive contribution of each selected ingredient to the composition, wherein the olfactive contribution of each selected ingredient depends on an impact strength of each selected ingredient that relates to the one or more parameters associated with each ingredient;
  converting for each selected ingredient, the olfactive contribution to a corresponding quantity of the ingredient based on a conversion factor indicative of each selected ingredient; and, when the user requests a sample of the composition;
  instructing an output device to dispense the corresponding quantity of the selected ingredients.

20. A method for producing a fragrance or flavour composition using a processor, comprising the steps of:
  selecting ingredients from a database via a user input means, wherein said database storing ingredients, ingredient records pertaining to said ingredients, and one or more parameters associated with said ingredients;
  adding pictograms representing the selected ingredients to an olfactive design space on a display, wherein the size of the pictogram for each selected ingredient represents an olfactive contribution of each selected ingredient to the composition, wherein the olfactive contribution to each selected ingredient depends on an impact strength of each selected ingredient that relates to the one or more parameters associated with each selected ingredient;
  converting for each selected ingredient, the olfactive contribution to a corresponding quantity of the ingredient based on a conversion factor indicative of each selected ingredient; and
  dispensing the corresponding quantity of the selected ingredients from an output device.

* * * * *